US011882516B2

(12) United States Patent
Marinier et al.

(10) Patent No.: US 11,882,516 B2
(45) Date of Patent: *Jan. 23, 2024

(54) CELL DETECTION, IDENTIFICATION, AND MEASUREMENTS FOR SMALL CELL DEPLOYMENTS

(71) Applicant: InterDigital Patent Holdings, Inc., Wilmington, DE (US)

(72) Inventors: Paul Marinier, Brossard (CA); Ghyslain Pelletier, Montreal (CA); J. Patrick Tooher, Montreal (CA); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/512,079

(22) Filed: Jul. 15, 2019

(65) Prior Publication Data

US 2019/0357126 A1 Nov. 21, 2019

Related U.S. Application Data

(63) Continuation of application No. 14/782,023, filed as application No. PCT/US2014/032891 on Apr. 3, 2014, now Pat. No. 10,405,267.

(Continued)

(51) Int. Cl.
*H04W 48/16* (2009.01)
*H04W 56/00* (2009.01)
*H04W 84/04* (2009.01)

(52) U.S. Cl.
CPC ......... *H04W 48/16* (2013.01); *H04W 56/001* (2013.01); *H04W 84/045* (2013.01)

(58) Field of Classification Search
CPC ..... H04W 48/16; H04W 24/10; H04W 16/32; H04W 52/0206; H04W 72/042;
(Continued)

(56) References Cited

U.S. PATENT DOCUMENTS 10,405,267 B2 9/2019 Marinier et al.
2012/0213109 A1 8/2012 Xu et al.
(Continued)

OTHER PUBLICATIONS

3rd Generation Partnership Project (3GPP), R1-120398, "Enhanced Cell Identification for Additional Carrier Type", 3GPP TSG RAN WG1 Meeting #68, Dresden, Germany, Feb. 6-10, 2012, pp. 1-4.
(Continued)

*Primary Examiner* — Wutchung Chu
*Assistant Examiner* — Najeeb Ansari
(74) *Attorney, Agent, or Firm* — Condo Roccia Koptiw LLP

(57) ABSTRACT

Cell detection information, such as cell identity, frequency, dormant/active mode, etc. may be determined. This cell detection information may be reported based on properties of a received Auxiliary Synchronization Signal (AuSS) or discovery signal. The received signal may be processed as a function of its timing, for example, with respect to timing of a serving cell. A WTRU may obtain cell detection information for a neighbor cell. A cell may also be detected by surrounding WTRUs. A WTRU may determine timing of cell reactivation from a detected property of the AuSS or discovery signal. A WTRU may trigger an RRC procedure upon selecting a dormant but temporarily reactivated cell. An eNB may transmit AuSS for a dormant cell based on detection of signals received from neighbor cells. Quasi-colocation (QCL) demodulation may be performed based on the detected signal. The on/off state of a cell may be indicated.

14 Claims, 6 Drawing Sheets

Related U.S. Application Data

(60) Provisional application No. 61/955,626, filed on Mar. 19, 2014, provisional application No. 61/933,235, filed on Jan. 29, 2014, provisional application No. 61/897,326, filed on Oct. 30, 2013, provisional application No. 61/882,584, filed on Sep. 25, 2013, provisional application No. 61/821,177, filed on May 8, 2013, provisional application No. 61/808,146, filed on Apr. 3, 2013.

(58) Field of Classification Search
CPC ........... H04W 72/0446; H04W 76/048; H04W 24/08; H04W 88/08
See application file for complete search history.

(56) References Cited

U.S. PATENT DOCUMENTS

| | | | |
|---|---|---|---|
| 2013/0064239 A1 | 3/2013 | Yu et al. | |
| 2014/0044057 A1 | 2/2014 | Gaal et al. | |
| 2014/0056243 A1* | 2/2014 | Pelletier | H04W 72/1263 370/329 |
| 2014/0092826 A1 | 4/2014 | Eriksson et al. | |
| 2014/0128078 A1* | 5/2014 | Zhu | H04W 52/0206 455/437 |
| 2014/0269368 A1* | 9/2014 | Xu | H04L 5/0053 370/252 |
| 2014/0286176 A1* | 9/2014 | Ro | H04W 36/0094 370/242 |
| 2015/0271743 A1 | 9/2015 | Teng et al. | |
| 2015/0326356 A1 | 11/2015 | Guan et al. | |
| 2015/0358094 A1* | 12/2015 | Yi | H04W 48/10 370/252 |
| 2015/0358923 A1 | 12/2015 | Teng et al. | |
| 2016/0007406 A1 | 1/2016 | Yi et al. | |
| 2016/0014778 A1 | 1/2016 | Zhou et al. | |
| 2016/0029333 A1 | 1/2016 | Seo et al. | |
| 2016/0295634 A1 | 10/2016 | Miao et al. | |
| 2018/0076873 A1* | 3/2018 | Xiao | H04L 5/0053 |

OTHER PUBLICATIONS

3rd Generation Partnership Project (3GPP), R1-130225, "Methods for Efficient Discovery of Small Cells", Mediatek Inc., 3GPP TSG-RAN WG1 #72, St Julian's, Malta, Jan. 28-Feb. 1, 2013, 4 pages.

3rd Generation Partnership Project (3GPP), R1-130493, "Dense Small Cell Mobility with Realistic Cell Detection", Nokia Siemens Networks, Nokia Corporation, 3GPP TSG RAN WG1 #72 Meeting, Malta, Jan. 28-Feb. 1, 2013, 5 pages.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Apr. 2011, pp. 1-117.

3$^{rd}$ Generation Partnership Project (3GPP), R1-130537, "Discussion on common solution to support efficient operation for Rel-12", TSG-RAN WG1 #72, St. Julian's, Malta, Jan. 28-Feb. 1, 2013, 4 pages.

3$^{rd}$ Generation Partnership Project (3GPP), R4-122659, "Discussion on the inter-frequency requirement for CA capability UE without Gap", TSG-RAN WG4 Meeting # 63, Prague, Czech Republic, May 21-25, 2012, 10 pages.

3rd Generation Partnership Project (3GPP), R1-131616, "On the Discovery of Small Cells", Ericsson, ST-Ericsson, 3GPP TSG RAN WG1 #72b, Chicago, USA, Apr. 15-19, 2013, 4 pages.

3rd Generation Partnership Project (3GPP), R1-131854, "Network Adaptation for Small Cell Operation Efficiency Enhancement", Huawei, HiSilicon, 3GPP TSG RAN WG1 Meeting #73, Fukuoka, Japan, May 20-24, 2013, 7 pages.

3rd Generation Partnership Project (3GPP), R1-133110, "Discussion on Load Shifting for Small Cells", Samsung, 3GPP TSG-RAN WG1#74 Meeting, Barcelona, Spain, Aug. 19-23, 2013, pp. 1-7.

3rd Generation Partnership Project (3GPP), R1-133456, "Views on Small Cell On/Off Mechanisms", NTT DoCoMo, 3GPP TSG RAN WG1 Meeting #74, Barcelona, Spain, Aug. 19-23, 2013, pp. 1-7.

3rd Generation Partnership Project (3GPP), R1-135662, "Use Cases for Discovery Signals", Ericsson, 3GPP TSG RAN WG1 Meeting #75, San Francisco, USA, Nov. 11-15, 2013, 6 pages.

3rd Generation Partnership Project (3GPP), R1-140202, "Discovery Signals Features for Energy-Efficient Small Cell Discovery and Measurements", Huawei, HiSilicon, 3GPP TSG RAN WG1 Meeting #76, Prague, Czech Republic, Feb. 10-14, 2014, 3 pages.

3rd Generation Partnership Project (3GPP), R1-140318, "Discussion on Small Cell On/Off Operation", LG Electronics, 3GPP TSG RAN WG1 Meeting #76, Prague, Czech Republic, Feb. 10-14, 2014, 5 pages.

3rd Generation Partnership Project (3GPP), R1-140367, "Overview of Small Cell On/Off Scenarios and Procedures", Samsung, 3GPP TSG-RAN WG1#76, Prague, Czech Republic, Feb. 10-14, 2014, pp. 1-11.

3rd Generation Partnership Project (3GPP), R1-140669, "Enhanced Small Cell On/Off Procedure for Single-Carrier and Multiple-Carrier Operation", ITL Inc., 3GPP TSG RAN1 #76, Prague, Czech Republic, Feb. 10-14, 2013, pp. 1-3.

3rd Generation Partnership Project (3GPP), TS 36.214 V11.1.0, "Technical Specification Group Radio Access Network, Evolved Universal Terrestrial Radio Access (E-UTRA), Physical Layer, Measurements (Release 11)", Dec. 2012, 14 pages.

3rd Generation Partnership Project (3GPP), R2-141663, "Scenarios and Cell States for Small Cell On/Off and Discovery", Samsung, 3GPP TSG RAN WG2 Meeting #85bis, Valencia, Spain, Mar. 31-Apr. 4, 2014, 8 pages.

3$^{rd}$ Generation Partnership Project; Technical Specification Group Radio Access Network; Evolved Universal Terrestrial Radio Access (E-UTRA); Medium Access Control (MAC) protocol specification (Release 16), 3GPP TS 36.321 V16.0.0, Mar. 2020, 141 pages.

3$^{rd}$ Generation Partnership Project; Technical Specification Group Radio Access Network; Technical Specification group Radio Access Network; Evolved Universal Terrestrial Radio Access (E-UTRA); Radio Resource Control (RRC); Protocol specification (Release 16), 3GPP TS 36.331 V16.0.0, Mar. 2020, 141 pages.

3$^{rd}$ Generation Partnership Project; Technical Specification Group Radio Access Network; NR; Physical channels and modulation (Release 16), 3GPP TS 38.211 V16.0.0, Dec. 2019, 129 pages.

3$^{rd}$ Generation Partnership Project; Technical Specification Group Radio Access Network; NR; Multiplexing and channel coding (Release 16), 3GPP TS 38.212 V16.0.0, Dec. 2019, 145 pages.

3$^{rd}$ Generation Partnership Project; Technical Specification Group Radio Access Network; NR; Physical layer procedures for control (Release 16), 3GPP TS 38.213 V16.0.0, Dec. 2019, 9 pages.

3$^{rd}$ Generation Partnership Project; Technical Specification Group Radio Access Network; NR; Physical layer procedures for data (Release 16), 3GPP TS 38.214 V16.0.0, Dec. 2019, 15 pages.

ETSI TS 136.331 V10.7.0, LTE; Evolved Universal Terrestrial Radio Access (E-UTRA); Radio Resource Control (RRC); Protocol specification (3GPP TS 36.331 version 10.7.0 Release 10), Nov. 2012, 307 pp.

ETSI TS 136 211, LTE; Evolved Universal Terrestrial Radio Access (E-UTRA); Physical channels and modulation (3GPP TS 36.211 version 10.1.0 Release 10), Apr. 2011, 105pp.

* cited by examiner

CELL DETECTION, IDENTIFICATION, AND MEASUREMENTS FOR SMALL CELL DEPLOYMENTS

CROSS-REFERENCE TO RELATED APPLICATIONS

This application is a continuation of U.S. Non-Provisional application Ser. No. 14/782,023, filed Oct. 2, 2015, which is the National Stage entry under 35 U.S.C. § 371 of Patent Cooperation Treaty Application PCT/US2014/032891, filed Apr. 3, 2014, which claims the benefit of U.S. Provisional Patent Application No. 61/808,146, filed Apr. 3, 2013; U.S. Provisional Patent Application No. 61/821,177, filed May 8, 2013; U.S. Provisional Patent Application No. 61/882,584, filed Sep. 25, 2013; U.S. Provisional Patent Application No. 61/897,326, filed Oct. 30, 2013; U.S. Provisional Patent Application No. 61/933,235, filed Jan. 29, 2014; and U.S. Provisional Patent Application Ser. No. 61/955,626, filed Mar. 19, 2014, the entire contents of which being hereby incorporated by reference herein.

BACKGROUND

In LTE systems, cell detection and identification or cell search may be supported by primary and secondary synchronization signals (PSS and SSS, respectively) that may be periodically transmitted, for example, every 5 ms. A wireless transmit/receive unit (WTRU) may start by detecting and identifying the PSS to gain initial timing information (5 ms timing) and one of a number of (e.g., 3) possible cell identities within a cell identity group. The WTRU may then identify the SSS whose position is fixed with respect to the PSS and may gain the frame timing information (10 ms timing) as well as the cell identity group, e.g., out of 168 possible groups and thus the cell identity, e.g., out of 504 possible identities.

SUMMARY

Radio link monitoring and/or measurements may be performed when a cell-specific reference signal (CRS) may not be present, for example, when a cell-specific reference signal may not be received in all subframes or in known subframes. For example, a cell may apply discontinuous transmission (DTX) or on/off operation on a subframe basis or over certain periods of time.

A wireless transmit/receive unit (WTRU) may detect one or more of an auxiliary synchronization signal (AuSS) or a discovery signal. The received signal may be processed as a function of its timing, for example, with respect to timing of a serving cell. The WTRU may perform radio link monitoring based on the detected signal.

The auxiliary synchronization signal or discovery signal may comprise a property, which may be used to perform radio link monitoring. Radio link quality estimation and/or measurement of the radio link may be performed. Quasi-colocation (QCL) demodulation may be performed based on the detected signal. The on/off state of a cell may be indicated.

A WTRU may detect a state of a cell by detecting a discovery reference signal (DRS) and determining the state of the cell based on the DRS. A state of a cell may be detected by awakening a WTRU from a discontinuous reception (DRX) mode and autonomously determining the state of the cell based on an assumption of the state of the cell.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

Figure 1A:
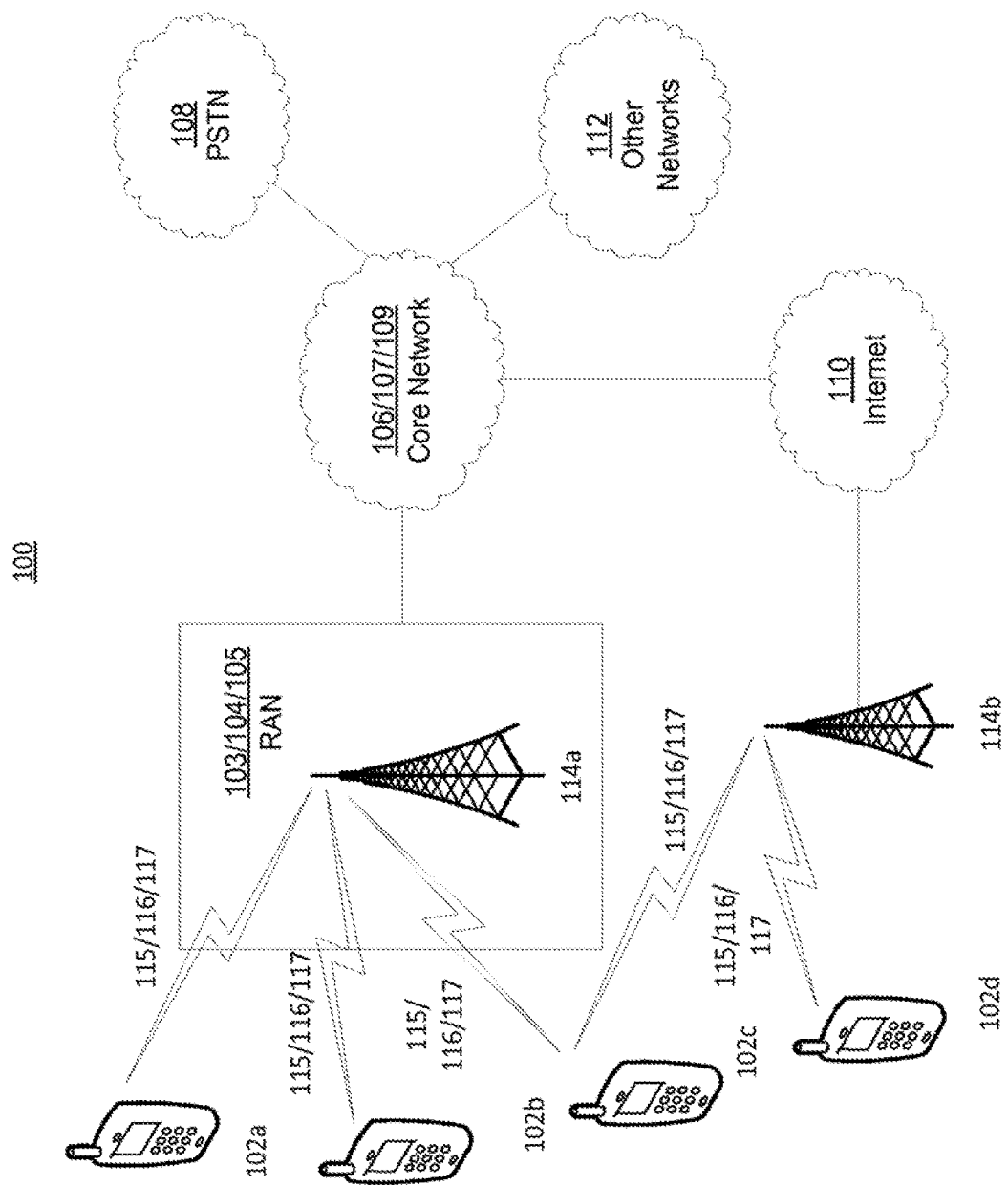
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with one or more of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
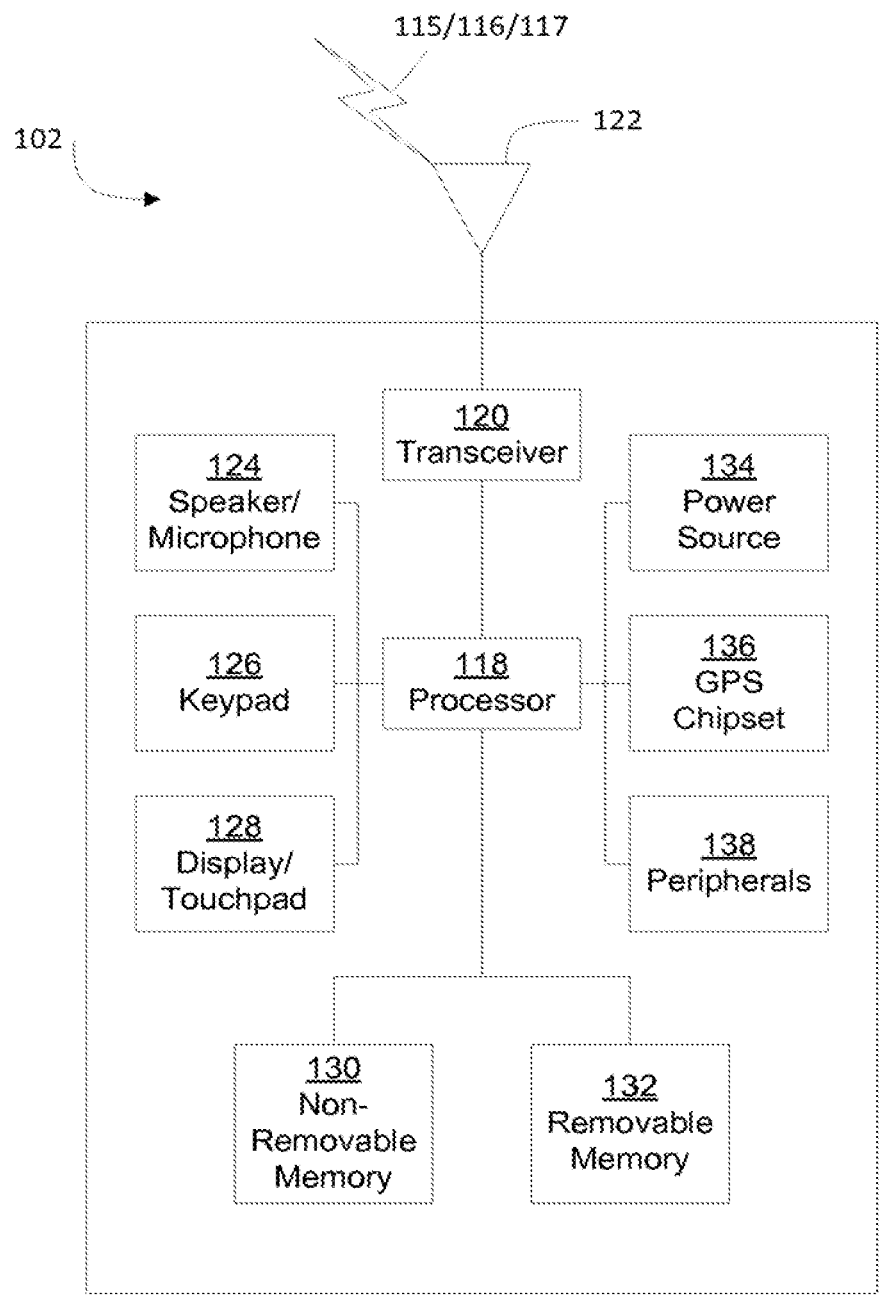
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
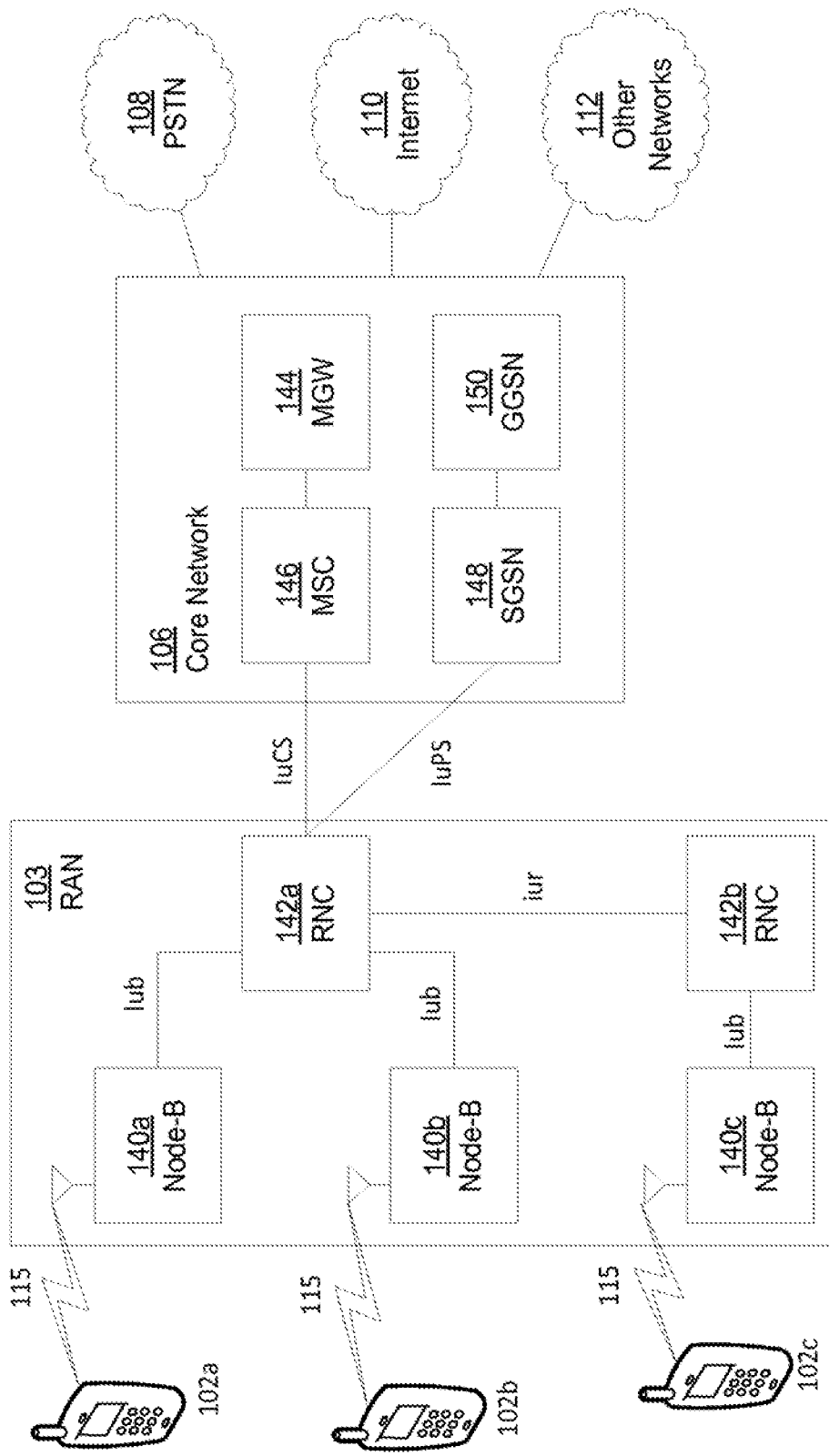
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
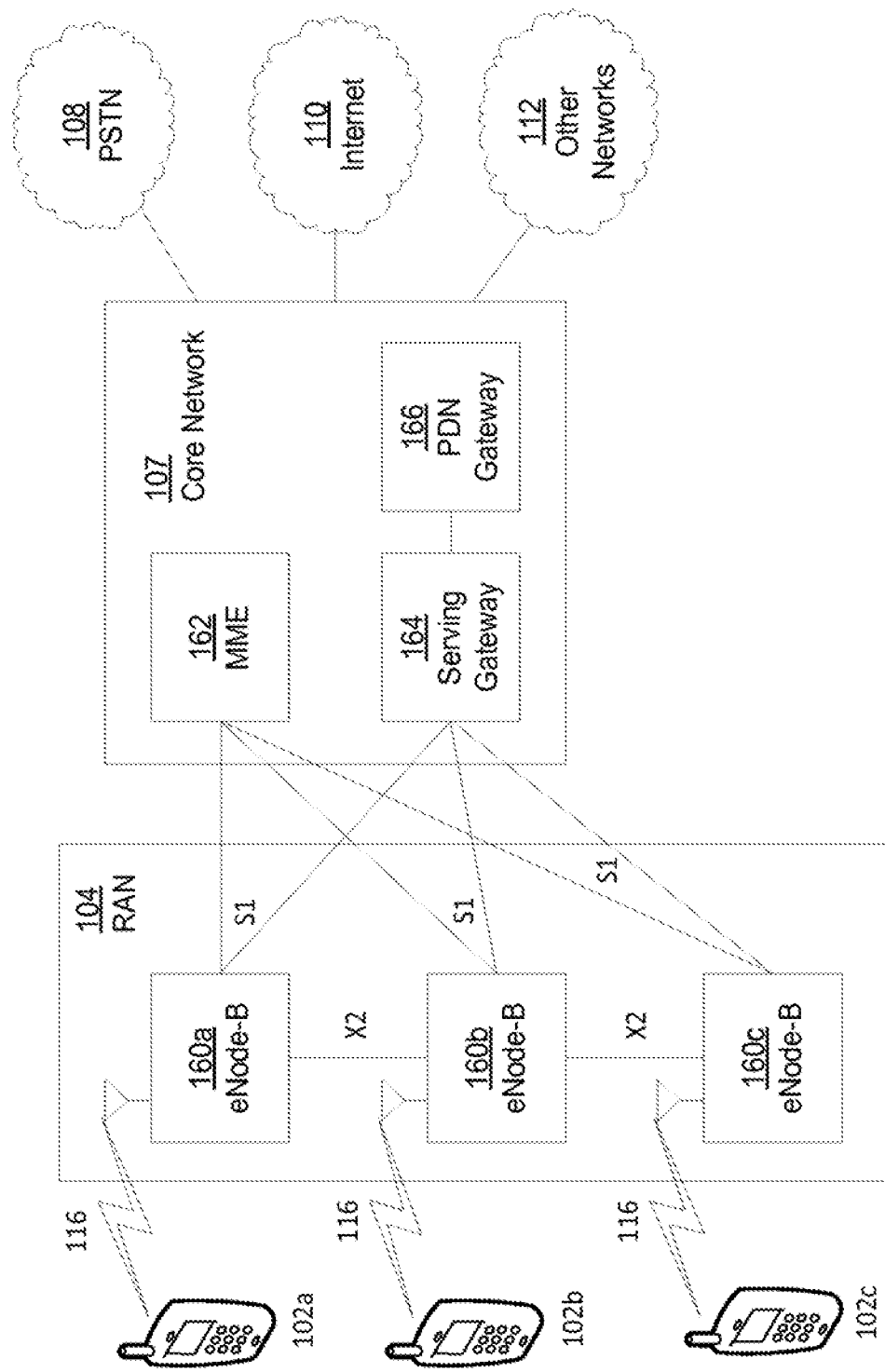
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
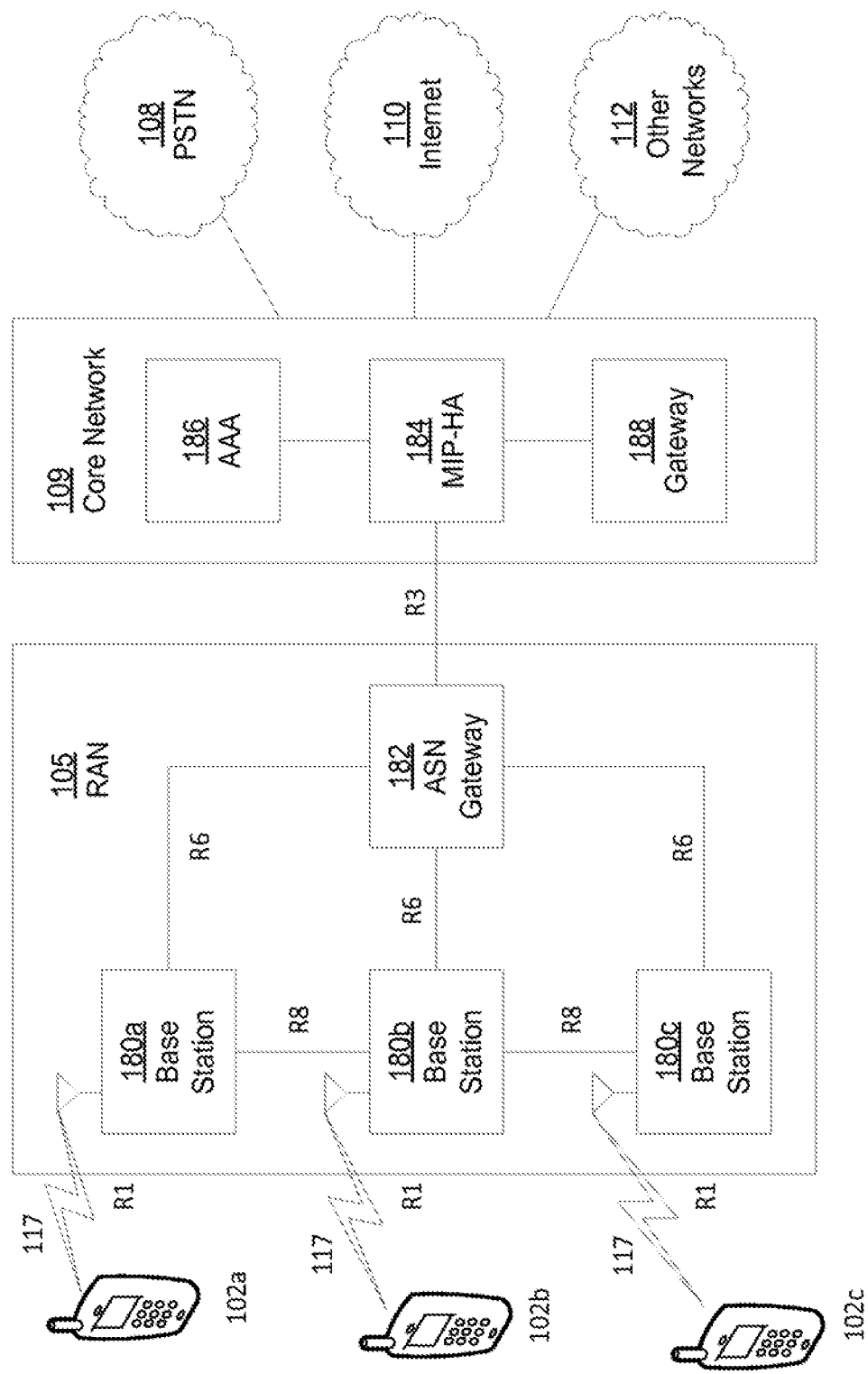
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In performing initial system access, the WTRU may initially access the resources of an eNB to establish a radio resource control (RRC) connection, for example, by performing a contention-based random access (CBRA). The WTRU may omit the cell radio network temporary identifier (C-RNTI) MAC Control Element from msg3 because the WTRU may not yet be assigned a C-RNTI. The WTRU may receive, e.g., in a random access response (RAR) a temporary C-RNTI, which may be used for scheduling of msg4 (which may echo the common control channel (CCCH) service data unit (SDU) included by the WTRU in msg3), which may be used to resolve contention. When the WTRU resolves contention, the WTRU may set its C-RNTI to the value of the temporary C-RNTI.

A WTRU may access the resources of an eNB by performing a contention-based random access (CBRA) or a contention-free random access (CFRA), for example, when operating in a connected mode, or in other scenarios. A random access procedure may be triggered, for example, by one or more of reception of the physical downlink control channel (PDCCH) (e.g., PDCCH order), a determination to send a scheduling request (RA-SR), or reception of a RRC Connection Reconfiguration with a mobilityControlInformation information element (IE) (e.g., handover (HO) command). In the case of CBRA, the WTRU may include a C-RNTI MAC control element in msg3, using the assigned C-RNTI. The WTRU may resolve contention from the reception of a DCI scrambled by the C-RNTI, e.g., DCI indicating an uplink grant. In the case of CFRA, the WTRU may determine that the random access procedure is successful from the reception of the RAR including the random access preamble identifier (RAPID) field indicating the transmitted preamble. The random access procedure for a SCell may be triggered from reception of PDCCH signaling and may be contention-free. In case of a preamble transmitted on a SCell (e.g., associated with the same eNB), the WTRU may verify that the temporary C-RNTI field is set to the WTRU's assigned C-RNTI.

Some wireless network deployments may involve a large density of small cells that may be synchronized with one another. However, the detection performance of primary synchronization signals (PSS) and secondary synchronization signals (SSS) in terms of latency and/or reliability may suffer due to potentially strong mutual interference between PSS and SSS signals from neighboring cells. This performance degradation may also occur with nonsynchronized cells when the load is high, as the PDSCH of neighbor cells may interfere with the PSS and/or SSS.

The higher latency of detecting PSS and/or SSS may result in a higher probability of connection failure, particularly for WTRUs moving at relatively higher speeds, e.g., 30 km/h, within the deployment.

Another issue may arise if some small cells are allowed to enter a dormant mode in which legacy PSS/SSS signals or cell-specific reference signal (CRS) signals may not be transmitted. Such cells may not be detectable using legacy procedures. In addition, it may not be possible to perform RRM measurements on such cells using legacy procedures.

Another issue may arise in connection with access by a WTRU of resources of a small cell that may have been in a dormant state, e.g., due to resumption or increase in traffic activity. Due to the bursty nature of traffic, it may be desirable to define an access technique whose latency for access is lower than several tens of milliseconds.

A WTRU that has an established RRC connection to a first eNB, e.g., a MeNB, may determine that it may attempt to access a cell of a second eNB, e.g., a SeNB. The network, e.g., the MeNB and the SeNB, may coordinate a priori such that the SeNB has sufficient information to determine the identity of a WTRU accessing one of its cells when it receives a preamble on the PRACH (e.g., by CFRA and/or using a dedicated PRACH resource) or during an ensuing random access procedure, e.g., by CBRA.

An access attempt may be delayed at least until the WTRU receives an order from the network that triggers the access attempt, for example, in the case of CFRA or other scenarios.

An access attempt may be delayed at least until the WTRU receives an order from the network that triggers the access attempt, for example, in the case of CBRA or other scenarios. The access attempt may require that the WTRU transmit RRC signaling, e.g., in msg3, that allows the SeNB and/or the MeNB, depending on where the corresponding SRB terminates. This procedure may not exist. For example, neither the RRC connection establishment procedure nor the RRC connection reestablishment procedure may be used for transmitting RRC signaling.

In some procedures, the WTRU may not have a way to autonomously access a cell of a second eNB while it has an established and working RRC connection to a first eNB. Methods, systems, and instrumentalities may be disclosed to enable the WTRU to access a cell of a second eNB while it has an established and working RRC connection to a first eNB. Such methods, systems, and instrumentalities may allow the WTRU to perform such access automatically and/or to combine a procedure related to cell on/off mechanisms.

Cell detection information, such as cell identity, frequency, dormant/active state, etc. may be determined. This cell detection information may be reported, e.g., based on properties of a received Auxiliary Synchronization Signal (AuSS) or based on the characteristics of a measurement configuration. For example, WTRU may be configured to determine one or more items of cell detection information (e.g., cell identity, frequency, dormant/active mode, etc.) based on one or more properties of an AuSS and/or one or more items of cell detection information may included in the AuSS (e.g., encoded in the AuSS). Cells that broadcast the AuSS may also transmit legacy PSS/SSS signals and/or may refrain from broadcasting the PSS/SSS signals. For example, rather than broadcasting the PSS/SSS signals, small cells (e.g., served by a SeNB) may broadcast the AuSS, which may include or otherwise indicate cell detection information for the small cell.

The examples disclosed herein may enable a WTRU to obtain cell detection information for a neighbor cell, e.g., a cell to which the WTRU may not be connected. A cell may also be detected by surrounding WTRUs. The examples disclosed herein in the context of a cell may also be used by a device or WTRU to be detectable or discoverable by surrounding WTRUs.

Figure 2:
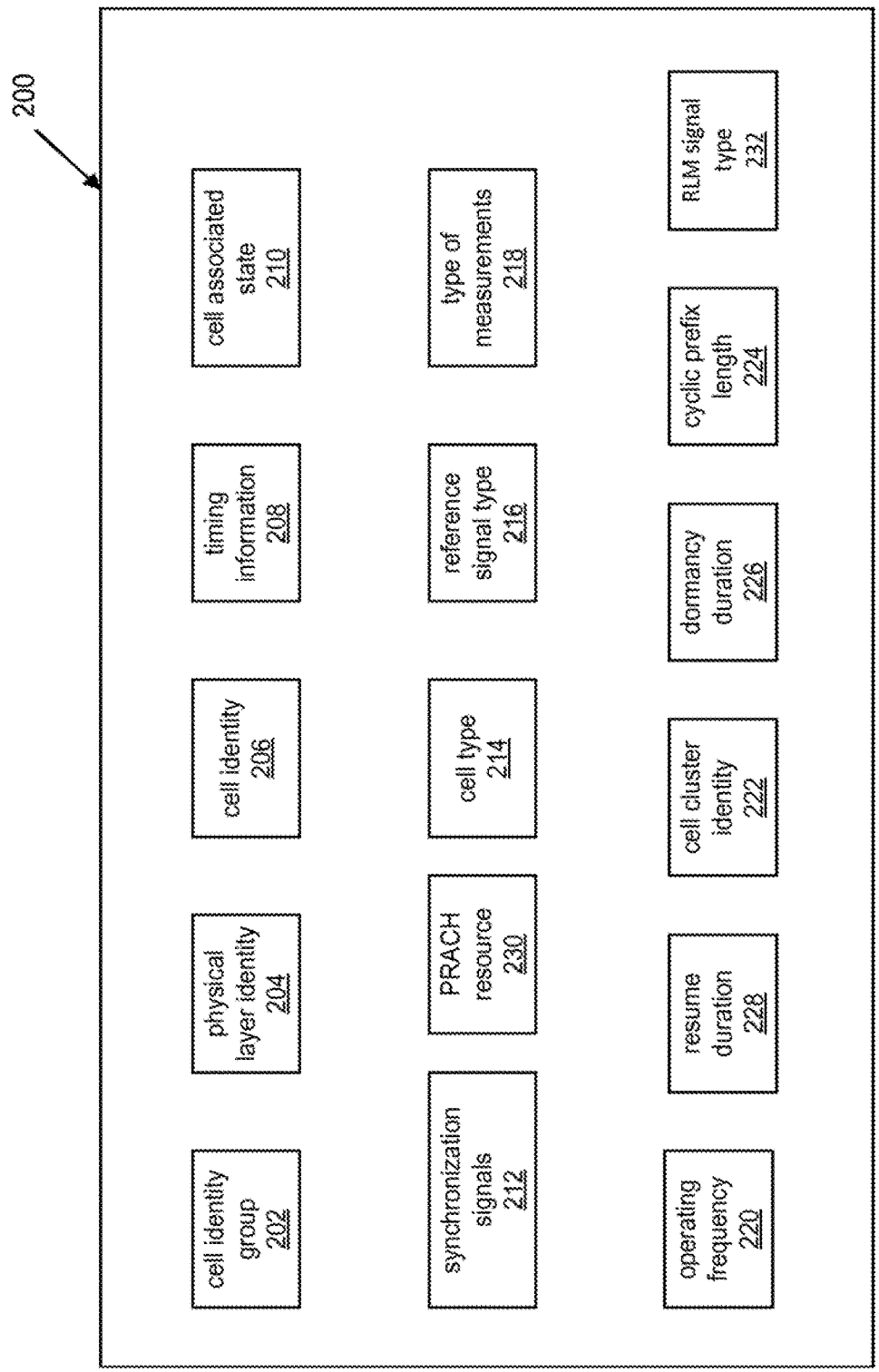
FIG. 2 is a diagram illustrating example elements and parameters that may be used as cell detection information.

As shown in FIG. 2, cell detection information 200 may include one or more of a variety of elements and parameters. For example, cell detection information 200 may include one or more parameters, in various combinations. For example, cell detection information 200 may include a cell identity group ($N^{(1)}_{ID}$) 202, which may take a value within a range (e.g., 0 to 167). Cell detection information 200 may also include a physical layer identity 204 within a cell-identity group ($N^{(2)}_{ID}$), which may take a value within a range (e.g., 0 to 2). Cell detection information 200 may also include a cell identity $N^{cell}_{ID}$ 206, which may be a function of the two above parameters (e.g., $N^{cell}_{ID}=3\ N^{(1)}_{ID}+N^{(2)}_{ID}$).

Cell detection information 200 may include timing information 208 (e.g., subframe timing, symbol timing, frame timing, etc.) of the cell. If a discovery or auxiliary synchronization signal (AuSS) signal is transmitted with a periodicity larger than one frame or according to a pattern that repeats over a period of more than one frame, the cell detection information 200 may include an indication of the timing of this discovery signal or discovery signal pattern, for example, with respect to the serving cell. The terms discovery signal and auxillary synchronization signal (AuSS) may be used interchangeably herein. The discovery or AuSS signal may be a signal broadcast from a cell that allows the WTRU and/or other base stations to determine one or more items of cell detection information regarding the broadcasting cell. For example, the discovery or AuSS signal may include similar information as legacy PSS/SSS signals, although the transmission format used for the discovery or AuSS signal may differ than the legacy format used for PSS/SSS. The discovery or AuSS signal may be a signal may include or otherwise indicate information that is not included in the legacy PSS/SSS signals; for example, the discovery or AuSS signal may include or otherwise indicate information regarding the active/dormant state of the cell or other cell detection information.

Cell detection information 200 may include a state 210 associated with the cell, e.g., whether the cell is in a dormant state, e.g., not transmitting certain signals such as cell-specific reference signals, certain synchronization signals, or certain physical channels. For a cell in a dormant state, cell detection information may include one or more of a duration or minimum duration 226 for which the cell may be dormant from the time a specific signal is received; a duration or minimum duration 228 until the cell may resume normal operation from the time a specific signal is received; a time at which the cell may resume normal operation; and/or a PRACH resource 230. For example, PRACH resource 230 may include an indication of one or more of a preamble to be used, a set of PRBs for to be used preamble transmission, a preamble format to be used, and/or the like. Cell detection information 200 may include information 212 as to whether synchronization signals such as PSS/SSS are transmitted (or are currently being transmitted) in the cell and/or as to whether cell-specific reference signals are transmitted (or are currently being transmitted) in the cell. Cell detection information 200 may also include a type 214 of the cell. For example, cell type information 214 may indicate whether the cell uses a legacy or new structure for one or more of synchronization signaling, reference signal transmission, for MIB/SIB acquisition, and/or control signaling transmission (e.g., PDCCH, enhanced PDCCH (ePDCCH), etc.), and/or the like. Cell detection information 200 may include an indication of the type 216 of reference signals transmitted in the cell. For example, the reference signal type information 216 may indicate whether the cell has a legacy structure for reference signals (e.g., which may also indicate whether or not cell-specific CRS are present) or whether the cell is of a different type (e.g., a New Carrier Type (NCT) cell, for which a different set of reference signal may be used, or, e.g., CSI-RS). Cell detection information 200 may include a type 218 of measurements that should be used when evaluating or accessing the cell. For example, the information regarding the type of measurements 218 may indicate the type of layer 3 measurements to be performed in the cell (e.g., such as whether or not legacy RSRP measurements are to be performed or a variation of the RSRP measurements should be performed). Cell detection information 200 may include or otherwise indicate one or more of an operating frequency 220 of the cell, an identity 222 of a cluster of cells to which the cell belongs, a length 224 of a normal or extended cyclic prefix to be used in the cell; and/or a type 232 of signal used for radio link monitoring (e.g., whether a discovery signal or a CRS may be used for radio link monitoring or whether any subframe or a restricted set of subframes may be used for RLM).

The WTRU may detect the presence and identify at least one property of at least one auxiliary synchronization signal (AuSS), discovery signal, or reference signal transmitted by a cell to accelerate the detection and identification of that cell and gain timing information. The WTRU may also use legacy signals (e.g., PSS/SSS) in conjunction with the AuSS to achieve this.

The AuSS or discovery signal may include one or more signals that may have a structure similar or identical to a type of signal that may be used in legacy systems, such as PSS, SSS, cell-specific reference signals (CRS), positioning reference signals (PRS), and/or CSI-RS, for example, transmitted in one or more symbols and/or subframes.

A network node can transmit AuSS for a cell according to a set of properties as a function of the cell identity, to facilitate its detection by WTRUs.

A cell or a WTRU may use any of a number of methods for cell identification alone or in any combination. For example, a property of AuSS may include a specific time-domain position in which AuSS is detected out of a finite set of possible time-domain positions. A time-domain position may be expressed in terms of a set or range of time-domain symbols within a set of timeslots or subframe numbers. The AuSS may be transmitted M times in one or more frames, or in every N frames. For instance, AuSS may be transmitted in time symbol $(2+N^{(2)}_{ID})$ of timeslots #0 and #10 in a frame, where the physical layer identity within a group $N^{(2)}_{ID}$ may be 0, 1 or 2. The time-domain position of the AuSS may be used by the WTRU to derive or determine one or more items of cell detection information.

Another property of AuSS may include a specific frequency-domain position in which AuSS is detected, out of a finite set of possible frequency-domain positions. A frequency-domain position may be expressed in terms of a subset of subcarriers (contiguous or not) within a carrier. This subset may be expressed in terms of a set of subcarriers within certain physical resource blocks (PRBs). The frequency-domain position of the AuSS may be used by the WTRU to derive or determine one or more items of cell detection information. In an example, the combination of time-domain position and frequency-domain position of the AuSS may be used by the WTRU to derive or determine one or more items of cell detection information.

For instance, AuSS may be transmitted in 62 subcarriers within the 6 center PRBs in case $N^{(2)}_{ID}=1$, or within the 6 adjacent lower PRBs in case $N^{(2)}_{ID}=0$, or within the 6 adjacent upper PRBs in case $N^{(2)}_{ID}=2$. Expressed differently, the set of subcarriers for AuSS may be defined as the values of k for which:

$$k = n - 31 + \frac{N^{DL}_{RB} N^{RB}_{sc}}{2} + 72(N^{(2)}_{ID} - 1)$$

$$n = 0, \ldots, 61 \quad (1)$$

where $N^{DL}_{RB}$ may be the number of resource blocks in the downlink and $N^{RB}_{sc}=12$ may be the number of subcarriers per resource block. In the above equation (1), the signal on subcarriers obtained by setting n to a value between −5 and −1, or between 62 and 66, may be set to zero as for PSS.

By introducing a dependency between the time-domain position and/or frequency-domain position of AuSS and an element of cell detection information, such as the cell identity, the issue of mutual interference may be avoided between signals transmitted from different cells when they use the same timing in a small cell environment.

AuSS may be generated in such a way that two AuSS signals generated using different values of a property are orthogonal, e.g., have zero or near-zero cross-correlation. For instance, a property of AuSS may include a specific cyclic shift (CS) of a Zadoff-Chu (ZC) sequence, out of a finite set of CS.

The ZC root sequence may be different from the three root sequences already used in the generation of PSS, to avoid ambiguity. A property of AuSS may also include a specific orthogonal cover code (OCC) out of a finite set of N codes $c_n$. For instance, one may define N=2 OCC codes as c0=[+1, +1] and c1=[+1−1] and generate AuSS in two consecutive time symbols t0 and t1 of a time slot, where its value in the first symbol may be d0=f $c_n$(0) and its value in the second symbol may be d1=f $c_n$(1), and f may be a signal common to AuSS, for instance, a specific ZC sequence.

AuSS may be constructed from N parts defined in the time-domain and frequency-domain, such that N−1 parts have a zero power and one part has non-zero power. In this case, a property may consist of the position of the non-zero power part of the AuSS in the time-domain and/or frequency-domain out of N possible positions.

AuSS may be constructed by applying a blanking pattern $b_p(n)$ to elements of a signal that has the same structure as PSS or SSS. For instance, the sequence $d_a(n)$ used for AuSS may be determined as:

$$d_a(n) = d(n) b_p(n) \quad (2)$$

where d(n) may be the PSS sequence or the SSS sequence of 62 symbols, and $b_p(n)$ may be a blanking pattern (p) out of a set of P possible blanking patterns.

AuSS may be generated in such a way that two AuSS signals generated using different values of a property have low cross-correlation. For instance, a property of AuSS may include a specific ZC root sequence, out of a finite set of possible Zadoff-Chu root sequences used for its generation. The Zadoff-Chu root sequences in this set may be different from the sequences used for the generation of PSS, to avoid ambiguity.

Hopping of properties may be introduced between different transmission instances of AuSS. Such hopping may improve robustness by avoiding the AuSS signal from a specific cell from being systematically interfered by the same strong interferer. Multiple hopping solutions may be designed. For instance, a hopping function $Y=f_h(X, m)$ may be introduced mapping a property parameter Y to a cell identity parameter X (such as $N^{(2)}_{ID}$) and a variable incremented at a new AuSS transmission m. The parameter Y may determine at least one property as described above such as a time-domain or frequency-domain position of AuSS (or of the non-zero part of AuSS), a CS of a ZC sequence, a ZC root sequence, and the like.

In one example of hopping, AuSS may be transmitted in time symbol (2+Y) of timeslot 10, where Y may be a pseudo-random or cycling function taking one of the values 0, 1 or 2 as a function of input parameters $X=N^{(2)}_{ID}$, where $N^{(2)}_{ID}$ is the physical layer identity parameter that may also take one of the values 0, 1, 2, and m may correspond to the frame number or may be a function of the frame number.

In another example of hopping, AuSS may be transmitted in a subset of transmission instances indexed by m. Some values of Y may correspond to absence of transmission (or zero-power transmission) for AuSS. This may reduce the amount of interference to other cells' transmissions of AuSS.

A WTRU may implement various methods for determining cell detection information based on the properties of received AuSS. For example, a WTRU may determine a cell identity parameter from a time-domain position of detected AuSS. The WTRU may determine the value of a cell identity parameter, such as the physical layer identity within a group $N^{(2)}_{ID}$, by determining the time symbol s within a time slot where the AuSS was detected or where the non-zero power part of AuSS was detected. The WTRU may know the frame timing of the neighbor cell from the timing of the serving cell, possibly based on a network indication that the cells are synchronized.

For instance, if AuSS is known to be transmitted in time symbol $(2+N^{(2)}_{ID})$ of timeslot 10, the WTRU may determine that $N^{(2)}_{ID}=s-2$. Following determination of $N^{(2)}_{ID}$ (and possible confirmation by subsequent reception of PSS), the WTRU may proceed with identification of the cell identity group $N^{(1)}_{ID}$ and remaining cell detection information by receiving SSS. The determination of $N^{(2)}_{ID}$ may be made faster and more reliable than by solely relying on PSS, because AuSS corresponding to different values of $N^{(2)}_{ID}$ may be transmitted at different times and may not interfere with each other.

The WTRU may determine a cell identity parameter from a frequency-domain position of detected AuSS. The WTRU may determine the value of $N^{(2)}_{ID}$ by determining the frequency-domain position where the AuSS was detected, e.g., $$N^{(2)}_{ID} = \frac{1}{72}\left(k + 31 - \frac{N^{DL}_{RB} N^{RB}_{sc}}{2}\right) + 1 \quad (3)$$

where k may be the lowest subcarrier where the detected AuSS has non-zero power. As in some examples, following determination of $N^{(2)}_{ID}$ (and possible confirmation by subsequent reception of PSS), the WTRU may proceed with identification of the cell identity group $N^{(1)}_{ID}$ and remaining cell detection information by receiving SSS.

The WTRU may determine a cell identity parameter based on one or more of a frequency-domain position of detected AuSS, a time-domain position of detected AuSS, a hopping function, and/or the frame timing. The WTRU may determine the value of by $N^{(2)}_{ID}$ by identifying the time-domain or frequency-domain position parameter Y where AuSS was detected and the transmission index m (based on the frame or timeslot timing) and deriving the value of $N^{(2)}_{ID}$ that may result in transmission of AuSS in position Y for transmission index m according to the hopping function $Y=f_h(N^{(2)}_{ID}, m)$.

The WTRU may determine a time-domain and/or frequency-domain position of AuSS from a cell identity parameter derived from another synchronization signal, such as PSS. The WTRU may determine the value of a cell identity parameter from a first signal, such as PSS, or a first auxiliary signal AuSS1, such as the physical layer identity within a group $N^{(2)}_{ID}$. The WTRU may determine the time-domain position and/or frequency-domain position of the auxiliary signal AuSS (or of a second auxiliary signal AuSS2, if AuSS1 was detected) based on $N^{(2)}_{ID}$. The WTRU may determine remaining cell detection information, such as the cell identity group $N^{(1)}_{ID}$ and the frame timing, from receiving the auxiliary signal AuSS at the determined time-domain and/or frequency-domain position. In this example, the auxiliary signal AuSS may have the same properties as SSS except for the time-domain and/or frequency-domain position.

The WTRU may determine timing of synchronization signals, such as SSS, or cell reactivation from a detected property of AuSS. For example, if the WTRU does not initially know the timing of the neighbor cell, the WTRU may determine the timing of the neighbor cell by first detecting AuSS and identifying the information (e.g., $N^{(2)}_{ID}$) from another detected property of the AuSS. The start of the time slot may then be determined from the time symbol corresponding to the information (e.g., $N^{(2)}_{ID}$). For instance, the WTRU may determine that a time slot in the neighbor cell starts at time $t0=\text{Tauss}-(2+N^{(2)}_{ID})$ Tm, where Tauss may be the time when AuSS was detected to start and Tm may be the duration of a time symbol.

The WTRU may determine the timing of the beginning of any period of time P if AuSS is transmitted with a period of P. For example, if P corresponds to a frame duration (10 ms), the WTRU may determine the start of a frame as $t0=\text{Tauss}-(2+N^{(2)}_{ID})$ Tm−ns Ts, where ns may be the timeslot number in the frame where AuSS is transmitted and Ts may be the duration of a timeslot. P may be the same period as PSS and SSS, e.g., 5 ms. The WTRU may then determine the timing of SSS to accelerate detection of the cell identity group ($N^{(1)}_{ID}$) and of the frame boundary. For instance, the WTRU may determine that the start of SSS may be received at times $tSSS=\text{Tauss}-(2+N^{(2)}_{ID})$ Tm+Delta(SSS,AuSS)+n P, where n may be an integer, P may be 5 ms and Delta(SSS,AuSS) may be a parameter corresponding the time offset between the start of SSS and the start of the timeslot where AuSS is transmitted. A similar method may be used to determine the timing and PSS to possibly confirm detection of the $N^{(2)}_{ID}$ parameter.

The WTRU may also determine, from a property of the AuSS, information on the time or approximate time at which synchronization signals (PSS/SSS) and/or other signals or channels (e.g., CRS, BCH) can be received from a cell that may currently be in a dormant state. Such information may be useful in case a dormant cell occasionally resumes transmission of such signals for a limited duration to support WTRUs that may have recently entered its coverage area. The WTRU may use this information to determine the time at which it may initiate reception procedures to detect the synchronization signals. The WTRU may interrupt reception procedures (e.g., enter a low activity state) until this time to reduce battery consumption.

For example, a specific detected Zadoff-Chu (ZC) root sequence, or a specific detected cyclic shift of a ZC root sequence, may indicate a minimum duration for which the cell may remain in a dormant state. For instance, a first value of a ZC root sequence, or other property, such as a Gold sequence or a frequency-domain position, may indicate that the cell may remain in a dormant state for at least 10 seconds. After detecting this value, the WTRU may enter a low activity state for 10 seconds and then initiate reception procedures to monitor synchronization signals and subsequently acquire system information of the cell if in idle mode. A second value of a ZC root sequence may indicate that the cell may remain in a dormant state for at least 20 seconds. Other values may indicate various lengths of the dormant period.

The WTRU may determine the operating frequency of a cell or of PSS/SSS based on a ZC root sequence or CS identified from AuSS. The WTRU may determine the frequency on which a cell is operating based on a property of a detected AuSS such as a specific ZC root sequence or a specific CS of a ZC sequence. The WTRU may also determine the carrier frequency on which synchronization signals (PSS/SSS) associated with the cell may be received. For instance, the WTRU may determine that a cell corresponding to a detected AuSS is operating on a first frequency if a first value of the CS is detected, or on a second frequency if a second value of the CS is detected. The WTRU may also determine that a cell is operating on the same frequency as the serving cell if a certain value of the CS is detected. The operating frequency corresponding to a certain value of the property may be indicated by the network.

The WTRU may determine a state of a cell based on a parameter of the AuSS. A cell may be configured with multiple sets of AuSS configurations. A set may implicitly indicate to a WTRU an operation state (for example, whether a cell is active or dormant). For example, AuSS may be transmitted in one time slot in a preconfigured symbol, and in another time slot there may be two or more time symbols (e.g., s1 and s2) that may be used for AuSS, with all of these mapping to the same cell identity $N^{(2)}_{ID}$. Which of the symbols is used for AuSS transmission may indicate the active or dormant state of the cell. For example, AuSS located in time symbol $(2+N^{(2)}_{ID})$ of a time slot may indicate a certain state (e.g., active), and AuSS located in time symbol $(5+N^{(2)}_{ID})$ may indicate another state (e.g., dormant).

AuSS may be detected on multiple sets of frequency domain bands, one or more of which may identify the state of the cell along with $N^{(2)}_{ID}$. Within the 62 symbols used for AuSS, different blanking patterns $b_p(n)$ may be used to indicate the state of the cell. For example, odd (or even) subcarriers may include AuSS to indicate one state and even (or odd) subcarriers may be left blank.

There may be different hopping functions of the AuSS for each possible state. A WTRU may attempt to decode the AuSS under multiple hopping assumptions to determine the state of the cell.

The state of a cell may be indicated to the WTRU by use of a different ZC root sequence and/or cyclic shift. The AuSS resources used for such a cell may be constant regardless of the state; however, the sequence used may implicitly indicate to the WTRU the state of the cell.

An eNB may transmit an AuSS for a dormant cell based on a detection of signals received from neighbor cells. One or more AuSS may be transmitted from a cell in a dormant state (or from a cell in any state) on the condition that no other cell, or no other cell that is not in a dormant state, can provide service under its coverage area. In this case, the AuSS may be transmitted to avoid creating a coverage hole.

To determine whether AuSS is to be transmitted for a cell, the eNB may initiate reception in downlink resources (e.g., frequency bands and/or subframes) to detect whether the transmission point used for the cell's transmissions is under coverage of another cell, e.g., from another eNB. If signals from another cell that meet certain criteria can be received with sufficiently high quality, the eNB may assume that most WTRUs under the coverage of the dormant cell may be able to detect the signals from this other cell, such that no coverage hole is created. For example, the eNB may attempt to measure/detect one or more of synchronization signals (e.g., PSS/SSS), cell-specific reference signals, and/or AuSS from another cell to determine if the other cell is providing sufficient coverage. For example, the eNB may determine if the received signal is above a quality threshold or signal strength threshold. BCH and/or system information may be decoded from another cell, and it may be determined whether the neighbor cell is part of the same PLMN or shares at least one tracking area with the cell. The eNB may also determine that the neighbor cell providing sufficient coverage is not in a dormant state before determining that it can move to a dormant state.

The WTRU may determine a state of a cell based on identifying AuSS, e.g., rather than identifying a corresponding PSS/SSS. The state may be, e.g., one of a dormant state or an active state, or one of an ON state or an OFF state. For example, the WTRU may determine that a cell is in an OFF state when the measurement of an AuSS for the cell meets a certain criterion that may be part of a measurement configuration. For example, some cells may have limited transmissions to reduce overall interference and/or to allow for energy savings. For example, a cell may transmit AuSS and limited cell-specific reference signals. The purpose of AuSS may be limited, for example, to allow measurements by WTRUs. To allow for further reduction in interference and/or energy savings gains, AuSS may be omitted in one or more frames. A cell may use a preconfigured subset of frames in a specific pattern, where AuSS may be included. Cells may be assigned, or may choose, different subsets of frames for AuSS to indicate its current state. For example, a cell in a dormant state may transmit AuSS in every third frame. The same cell in an active state may transmit AuSS in one or more frames (e.g., every frame). A WTRU may monitor multiple frames (e.g., three frames) to determine the periodicity of AuSS, and from this it may determine the state of the cell. Furthermore, the state of the cell may also implicitly indicate to the WTRU the type of cell-specific reference signal the cell transmits, as well as the appropriate resources for such cell-specific reference signals.

If a WTRU is unsure whether a PSS/SSS is transmitted, the AuSS may be divided into two parts, e.g., $AuSS_1$ and $AuSS_2$. The $AuSS_1$ may be included in one or more frames (e.g., every frame) or in a predetermined pattern of frames. One or more sets of resources used for $AuSS_2$ (including RE mapping and sequence configuration) may be indicated to the WTRU in $AuSS_1$ by one or more of the location of $AuSS_1$ within a frame (e.g., the OFDM symbol and/or subcarriers); the ZC root sequence or the cyclic shift of $AuSS_1$; the location of specific elements of the $AuSS_1$, for example, the location of zero-power resources; and/or the content of $AuSS_1$; for example, some WTRUs of the $AuSS_1$ may include $AuSS_2$ configuration information.

The WTRU may then attempt to decode $AuSS_2$ on multiple sets of resources. Upon successful decoding of $AuSS_2$, the WTRU may implicitly determine the state of the cell based on what set of resources is used for $AuSS_2$. For example, one set of resources for $AuSS_2$ may be the PSS and/or SSS resources, and this may indicate to the WTRU that the cell is in the active state.

The WTRU may determine a PRACH resource configuration for a cell from AuSS or a discovery signal, e.g., as a function of one or more aspects of an AuSS or a discovery signal. For example, the WTRU may determine a set of PRBs associated with a PRACH resource for the concerned cell as an offset from the frequency-domain position of the detected AuSS or discovery signal. The WTRU may determine the timing of a PRACH resource, e.g., a subframe in which a PRACH resource may be available, for the concerned cell as an offset from the time-domain position of the detected AuSS or discovery signal. The WTRU may determine the value of an offset (e.g., frequency and/or time domain offset) for a PRACH resource for the concerned cell as a function of a property of the detected AuSS or discovery signal. For example, the WTRU may determine a PRACH resource to use for preamble transmission as a function of one or more of a property of a Zadoff-Chu (ZC) sequence (e.g., cyclic shift, root sequence), a specific orthogonal cover code (OCC) for the detected AuSS or discovery signal, the position of the non-zero power part of the detected AuSS or discovery signal in the time domain and/or frequency domain, a hopping pattern for the detected AuSS or discovery signal, and/or the cell identity (e.g., physical cell identity) associated with the detected AuSS or discovery signal. For example, the WTRU may determine the corresponding PRACH resource by using a property as an indexing function in a preconfigured table or in a configuration received by the network. The configuration may include a PRACH resource associated with a discovery resource defining the value of the property for the discovery signal. The WTRU may use the PRACH configuration to transmit a preamble, e.g., to indicate to the eNB its presence upon detecting the corresponding AuSS or discovery signal.

Discovery signals may be transmitted according to different subframe patterns, which may depend on whether cells are synchronized on a frame or subframe basis. When attempting to detect a discovery signal, such as PSS, SSS, AuSS, CRS, or a combination thereof, the WTRU may process the received signal differently depending on the timing with respect to the signals of the serving cell.

For example, the WTRU may attempt to detect a synchronization signal (e.g., PSS, SSS, or AuSS) of a neighbor cell in a subframe and in a time symbol where PSS/SSS or AuSS of the serving cell is received, for example, using interference cancellation (e.g., suppressing or subtracting the PSS/SSS or AuSS of the serving cell known to be present to improve detection of other signals). A detection attempt may be performed by measuring a signal in the subframe (e.g., in a single subframe), without averaging. For other subframes, the WTRU may assume that the PSS/SSS or AuSS of a neighbor cell not synchronized with the serving cell may be present. The WTRU may assume that the PSS/SSS or AuSS of the neighbor cell may be repeated N times at known time intervals (e.g., 5 ms and/or 10 ms later) to improve robustness, and may attempt detection by using the signals received from these N subframes.

Cell detection information can be determined from a network indication. The WTRU may utilize information to assist in the detection of an AuSS or discovery signal received from a neighbor cell or to perform measurements. Some of the information may also be used to assist in the detection of PSS and SSS signals from neighbor cells. An indication by the network may be provided by higher layer signaling such as radio resource control (RRC), either from system information or dedicated signaling if in connected mode. For instance, the information may be provided as an information element part of the measurement configuration. The WTRU may also receive information from physical layer signaling. For instance, the WTRU may determine from the value of a field of downlink control information received from PDCCH or E-PDCCH one of a set of possible values configured by higher layers.

The WTRU may use information regarding the presence of an AuSS or discovery signal to assist in detecting an AuSS received from a neighbor cell. The WTRU may be explicitly indicated by the network that at least one AuSS signal or discovery signal may be received from at least one neighbor cell. The WTRU may implicitly derive this from other information, such as an indicated type of cell in the layer or frequency in which the WTRU operates, whether the serving or neighbor cell may support a new or enhanced carrier type (e.g., NCT), or whether the serving cell may support a normal or an extended cyclic prefix.

The WTRU may also use information regarding synchronization or frame timing to assist in detecting an AuSS or discovery signal received from a neighbor cell. The WTRU may be explicitly indicated by the network whether neighbor cells are or may be assumed to be synchronized with the serving cell (or not) at the frame level or at the subframe level, or may derive this from another indication such as an indicated type of cell in the layer or frequency in which the WTRU operates. The WTRU may be explicitly indicated by the network whether there is synchronization at the system frame number (SFN) between the serving cell and neighbor cells. The WTRU may assume that synchronization with the serving cell at the subframe, frame, or SFN level exists if the AuSS signal or the discovery signal is present.

The WTRU may attempt detection of a discovery signal or AuSS of neighbor cells in specific, e.g., prescribed time windows. A time window may start a certain duration before the reception time of a first discovery signal of the serving cell and may end a certain duration after the reception time of a second discovery signal of the serving cell. The first and second discovery signals may be the same or may correspond to the start and end of a group of discovery signals that may include PSS/SSS and CRS transmitted over a short duration. This may avoid excessive power consumption for the WTRU while not requiring that synchronization between cells be realized with a high level of accuracy.

The WTRU may attempt detection within these time windows if indicated by the network that discovery signals transmitted from neighbor cells may be assumed to be transmitted simultaneously with the discovery signals from the serving cell. This indication may be provided for specified cells whose identity may be provided as part of the measurement configuration.

The WTRU may also use information regarding a set of possible time-domain and/or frequency-domain position of the AuSS or discovery signal to assist in detecting an AuSS or discovery signal received from a neighbor cell. The WTRU may be explicitly indicated by the network a set of time-domain positions or frequency-domain positions where an AuSS or discovery signal may be received. This information may be expressed in the time reference of the serving cell or, equivalently if synchronization is assumed, in the time reference of the neighbor cell. For instance, the WTRU may be indicated that an AuSS or discovery signal may be present in symbols #2, #3, and #4 of timeslots #0 and #10 in a specific frame, or in an indicated set of frames. The WTRU may also be indicated that an AuSS or discovery signal may be present in subcarriers centered around a specific PRB.

The WTRU may be indicated the start time of a pattern of subframes in which a set of discovery signals may be transmitted. The start time may be expressed with respect to the start time of a set of discovery signals in the serving cell, for example, in units of subframes.

The indication may be provided from downlink control information (DCI). In this case, the reception timing of this DCI may implicitly indicate the time-domain position of an AuSS or discovery signal. For instance, the AuSS or discovery signal may be detected k0 subframes following DCI reception.

The WTRU may also use information regarding a cell identity parameter $N^{(1)}_{ID}$ or $N^{(2)}_{ID}$ to assist in detecting an AuSS or discovery signal received from a neighbor cell. The WTRU may be explicitly indicated a physical layer identity within a group $N^{(2)}_{ID}$ of neighboring cells. This may allow the WTRU to speed up detection by enabling identification of the cell identity group $N^{(1)}_{ID}$ (and thus the cell identity $N_{ID}$) from SSS without having to detect PSS first.

The WTRU may be explicitly indicated a cell identity group, or a set of cell identity groups $N^{(1)}_{ID}$ of neighboring cells. This may allow the WTRU to speed up detection by enabling identification of the cell identity from the $N^{(2)}_{ID}$ from PSS without having to detect SSS. This solution may be particularly useful in combination with a solution enabling the WTRU to determine frame timing of neighbor cells (e.g., based on an indication of synchronization).

The WTRU may also use information regarding a cyclic prefix to assist in detecting an AuSS or discovery signal received from a neighbor cell. The WTRU may be explicitly indicated by the network the cyclic prefix that may be assumed for neighbor cells. The WTRU may assume that the cyclic prefix of a neighbor cell from which an AuSS or discovery signal may be detected is the same as in the serving cell. The WTRU may attempt AuSS or discovery signal detection of a neighbor cell if the cyclic prefix of the serving cell is of a certain type, e.g., for a normal cyclic prefix.

The WTRU may be provided with a discovery resource that may include some or all parameters describing the properties of an AuSS or discovery signal. For example, a discovery resource may include information such as a carrier frequency, resource block allocation within a carrier, subframe configuration (e.g., a set of subframes where the signal is present), a resource configuration (e.g., a set of resource elements in a subframe), a parameter used for initializing a sequence, and/or the like.

The WTRU may be configured with a PRACH configuration associated with a discovery resource or a group of discovery resources in a layer. The WTRU may use the PRACH configuration to transmit a preamble, e.g., to indicate to the eNB its presence upon detecting the corresponding AuSS or discovery resource.

The WTRU may perform measurements on an AuSS or discovery signal. For example, the WTRU may perform measurements of signal strength, quality, and/or interference from at least one AuSS or discovery signal or a reference signal associated with a discovery signal or AuSS. The measurements may include, for example, a measurement similar to RSRP or RSRQ, but possibly defined on a reference signal such as CSI-RS, discovery signal, or AuSS instead of the CRS. Such a measurement may be referred to as DS-RSRP and/or DS-RSRQ. The measurements may include a measurement of interference defined, e.g., as the energy measured over a resource such as a CSI-IM resource. The measurements may include a measurement of signal-to-interference-plus-noise ratio (SINR) defined from at least one reference signal and possibly at least one interference measurement resource. For instance, such a measurement may be defined as the ratio between an RSRP and a measurement of interference.

The WTRU may be configured by the network to perform one or more measurements for one or more signals of a set of signals. The information for a signal may be provided in a discovery resource. The information may include information such as a carrier frequency, resource block allocation within a carrier, subframe configuration (e.g., a set of subframes where the signal is present), a resource configuration (e.g., a set of resource elements in a subframe), a parameter used for initializing a sequence, and/or the like. A discovery resource may correspond to a signal transmitted from a cell that may be in a dormant state or from a cell that may be in a normal or active state but that may enter a dormant state. Performing such measurements while the cell is in a dormant state may enable a faster decision to wake up and use that cell, e.g., upon resumption of activity.

The WTRU may apply different measurement periods for the reference signal received power (RSRP) and the E-UTRA carrier received signal strength indicator (RSSI) to provide a measurement reflecting recent load conditions, e.g., the most current load conditions. The network may be able to make assignment decisions based on instantaneous conditions, e.g., instead of based on an average of recent past conditions. The WTRU may perform measurements of RSRP, RSRQ, RSSI, SINR, and/or interference on CSI-IM using a first measurement period for the received signal RSRP (e.g., also used in the numerator of RSRQ or SINR) and a second measurement period for the RSSI and/or an interference measurement based on CSI-IM. The first measurement period may be longer than the second so that the WTRU may estimate an average over fading of the reference signal received power of a cell. Similar examples may be applied for DS-RSRP and/or DS-RSRQ; DS-RSRQ may use DS-RSRP in the numerator rather than RSRP.

A WTRU may perform one or more actions upon detecting an AuSS or discovery signal. The WTRU may be configured to monitor, for example, an AuSS or a discovery signal in a frequency other than that of the operating frequency of the associated small cell(s), e.g., in the frequency of the macro cell (e.g., in a macro co-channel detection case). For example, the WTRU may be configured to detect the presence of one or more small cells in another frequency without performing reception of PSS/SSS for the concerned cell(s) (e.g., this may be a trigger for a discovery report). The WTRU may be configured to attempt reception of PSS/SSS for the concerned cell(s) following successful detection of an AuSS or discovery signal. If the WTRU subsequently fails to acquire PSS/SSS, the WTRU may determine that the cell is in a dormant state (e.g., this may be a trigger for a discovery report). This may be a trigger to initiate a measurement on a discovery resource as disclosed herein.

The WTRU may be configured to monitor a discovery resource in the operating frequency of the associated small cell(s) (e.g., in a single layer detection case), independently of whether or not the WTRU is connected to a serving cell in a different frequency/band (e.g., independently of the presence of a macro). For example, the WTRU may detect the presence of one of more small cells in that frequency and perform reception of PSS/SSS for the concerned cells.

Measurement configuration and reporting may be performed. The WTRU may be configured with a measurement configuration that may include at least one measurement identity, e.g., one measurement object linked with one reporting configuration.

In addition to a carrier frequency, and possibly also in addition to a list of cell specific offsets and a list of blacklisted cells, a measurement object may include a list of one or more discovery resources, such as, for example, AuSS or discovery signal entries. An entry may include at least one AuSS or discovery signal property. There may be one such AuSS entry for each allowed cell of the measurement object configuration. An AuSS property may correspond to cell detection information such as a cell identity, a time-domain position, a state of the cell (e.g., dormant or active), and/or a frequency domain position for the AuSS or the like. For example, the WTRU may be configured with a reporting configuration for a measurement object that may include a state of a cell, e.g., such that a measurement report may indicate the state of the cell, e.g., based on the reported identity. The WTRU may be configured with a list that may correspond to a whitelisted set of cells. Such configuration may also include information such as the type of cell associated with the AuSS or discovery signal or resource (e.g., whether the cell uses a legacy structure, such as a cell-specific CRS that may be used for RSRP measurements or an alternative set of reference signals for measurements, which may include AuSS).

The WTRU may, for example, be configured with a set of measurement thresholds for all discovery resources or on a per discovery resource basis. The WTRU may be configured to use a specific discovery resource for performing measurements on a serving cell of its configuration (e.g., an Scell). In such scenarios and others, a measurement performed on this discovery resource may be used as the measurement of the serving cell on the corresponding frequency for the purpose of measurement triggering and reporting, e.g., in a measurement event corresponding to the detection of a neighbor cell becoming better than an Scell in its frequency (A6). Such a configuration may be useful, for example in scenarios in which an activated or deactivated Scell may enter a dormant state. The WTRU may compare between values of different types of measurements, for example perhaps when determining if a configured measurement event has occurred, among other scenarios. The WTRU may use the value of a measurement type that may be defined for a discovery signal (such as DS-RSRP) for the Scell and may compare this value to the value of a legacy measurement type such as RSRP for a neighbor cell, perhaps for the purpose of determining if an event A6 has triggered, among other scenarios, for example. The same may apply between DS-RSRQ and RSRQ, for example.

For example, the WTRU may start performing measurements and/or may trigger a measurement report as per the legacy procedure for a measurement object that includes the discovery resource once the WTRU successfully detects the corresponding discovery resource and/or once the discovery resource measurement meets the configured criteria (e.g., measurement threshold), and which discovery resource is at least not part of a restricted set of cell identities or part of a set of whitelisted cell identities, or corresponds to an allowed cluster.

The reporting configuration may include events or configuration specific to a discovery resource, such as an event trigger and/or a reporting format. One event trigger may be that a neighbor may become better than a threshold and the neighbor may be detected by a suitable AuSS or discovery signal (e.g., an AuSS or discovery signal is detected and reporting for the cell is allowed). Another event trigger may be that a neighbor may become better than a threshold by an offset and the neighbor may be detected by a suitable AuSS or discovery signal (e.g., an AuSS or discovery signal is detected and reporting for the cell is allowed). The reporting configuration may include a reporting format, e.g., the WTRU may report the identity of the cell that triggered the event and/or the index associated with the corresponding discovery resource. The WTRU may report timing information of the AuSS or discovery signal, for example, with respect to the timing of the serving cell. The WTRU may perform measurements according to such extension for AuSS or discovery signal by first detecting an AuSS or discovery signal in the discovery resource, and performing the applicable measurement for the detected cell.

Detection configuration and reporting may be performed for an AuSS or discovery signal. The WTRU may be configured for reception of an AuSS or discovery signal. Additionally, the WTRU may be configured with a detection reporting configuration. Such configuration may allow the WTRU to determine, upon successful detection of AuSS or discovery signal, whether or not the transmission of a detection report may be triggered. This may, for example, be a function of the cell detection information derived from the AuSS itself and/or from acquiring PSS/SSS for the corresponding AuSS and/or from the measurement taken on the discovery signal or resource.

The list of discovery resource detection objects may be indexed, e.g., using an identity. The WTRU may receive control signaling that may modify the activation state of an AuSS or discovery resource detection configuration. For example, such control signaling may be received in a DCI on PDCCH, or as a MAC CE. The control signaling may include the index to the applicable AuSS or discovery resource detection object.

The WTRU may trigger a detection report if it determines that the AuSS or discovery resource detected corresponds to one or more of a specific cell (e.g., based on the physical cell identity, a cell identity, an index to the received AuSS or discovery signal from a set of resources and/or AuSS), a specific cluster associated with the detected AuSS (cluster ID), a type of cell associated with the detected AuSS (e.g., whether the cell is of a legacy type or of a different type), a measurement quantity, and/or the like.

Such configuration for an AuSS or a discovery signal may include one or more of an AuSS detection object, an AuSS or discovery signal reporting configuration, an AuSS or discovery signal detection identity, and/or an AuSS measurement gap configuration. An AuSS detection object may include one or more property or properties of an AuSS according to those disclosed herein. For example, this may include one or more of a frequency and/or an index to an AuSS resource. The WTRU may use the object configuration to determine where it may attempt detection of AuSS, e.g., the object may include a list of whitelisted AuSS and/or cell(s) or a list of blacklisted AuSS and/or cell(s).

An AuSS or discovery signal reporting configuration may correspond to a list of reporting criteria. For example, this may include one or more of an index to a discovery resource (e.g., if not provided by the detection object above), a cell identity, a cluster identity, and/or a cell type. The AuSS or discovery signal reporting configuration may additionally include whether or not successful acquisition of PSS/SSS may be required to determine if AuSS or discovery signal detection is successful. The WTRU may use the reporting configuration to determine, once it detects AuSS or discovery signal, whether or not the transmission of a detection report may be triggered. Additional criteria may include a periodic or a single event description. Such configuration may additionally include a reporting format, for example, the number of detected AuSS or discovery signals and/or cells to report. The configuration may include a measurement threshold. The WTRU may use this configuration to determine whether the transmission of a discovery report may be triggered, e.g., if the measurement taken on the discovery resource is above an absolute threshold or offset better than a reference point.

An AuSS or discovery signal detection identity may correspond to a list of identities that may link a detection object with a reporting configuration. For example, the WTRU may include the AuSS or discovery signal detection identity in the detection reporting or also in a measurement report as described herein such that the network may determine which specific AuSS or discovery signal is being reported.

An AuSS measurement gap configuration may be associated with the detection process and/or associated with the detection process alone, for example. For example, this may be useful for a WTRU that is connected to a macro layer (e.g., only to a macro layer) and/or that does not have a cell configured in the frequency/band of the AuSS (e.g., in case of single layer detection case with a connected macro) such that the WTRU may not be required to turn on an additional transceiver chain for the purpose of cell detection alone.

The WTRU may trigger a detection report when the WTRU is configured to detect the presence of one or more cells in a given frequency using a configuration for AuSS or discovery signal detection and PSS/SSS is not detected, e.g., either the WTRU is not configured to acquire PSS/SSS or it has failed to do so, e.g., the cell may be in a dormant state. The WTRU may also or instead trigger a detection report when the WTRU is configured to detect the presence of one or more cells in a given frequency using a configuration for AuSS or discovery signal detection and no associated measurement is configured. The WTRU may trigger a detection report when the WTRU is configured to detect the presence of one or more cells in a given frequency using a discovery resource and an associated measurement is configured and the measured discovery resource meets the measurement configuration criteria.

The WTRU may initiate transmission of an RRC SDU over a SRB of the WTRU's configuration or a preamble or RACH procedure, for example, when the WTRU triggers the transmission of a detection report or in other scenarios.

For the network side, the network node may determine from the reception of an AuSS detection report whether or not one or more cells that corresponds to a detected discovery resource may change from a dormant state to an active state. For example, the network node may perform such a determination from the received detection report that it indicates that such a cell is in a dormant state. Such a change in state may be indicated over an X2 or similar interface between the network node that received the report and the eNB associated with one or more detected cells. For example, a dormant state may be a state, e.g., where the AuSS is transmitted from the cell but other signals are not. For example, an active state may be a state, e.g., where a reference signal or signals (e.g., cell-specific CRS or similar) that may be suitable for radio quality measurements (e.g., RSRP or similar) may be transmitted. Additional network actions may be disclosed herein.

The network node may determine from the reception of a detection report whether or not it may instruct to the WTRU to perform one or more of a measurement for the cell or cells that corresponds to a detected discovery resource, if not already configured for the concerned WTRU and/or if no such measurement report was received together with the detection report. The network node may also or instead determine whether to instruct the WTRU to perform RRC reconfiguration that adds one or more of the detected cell or cells to the WTRU's configuration, for example, if a receive measurement report indicates sufficient radio quality.

The WTRU may trigger transmission of a measurement report when activity resumes if an inactivity timer had expired. The WTRU may trigger transmission of a measurement report containing measurement results applicable to at least one discovery resource and possibly other cells upon resumption of activity after a period of inactivity, if so configured. The WTRU may initiate or restart a timer, e.g., a measurement inactivity timer, when transmitting on PUSCH or receiving from PDSCH or PDCCH/E-PDCCH. If the timer was not already running, e.g., if the timer had expired, the WTRU may trigger transmission of a measurement report. This may reduce or minimize the delay between resumption of activity and the time when the network obtains measurements from the WTRU.

A WTRU may perform idle mode procedures, such as initial access and cell reselection. A WTRU may receive synchronization signals (e.g., PSS/SSS) and acquire system information from a dormant cell that has temporarily reactivated its transmissions to support WTRUs that may have entered its coverage area.

The WTRU may determine that the cell from which PSS/SSS and other signals are transmitted may be in a dormant state, but may be temporarily reactivated, by detecting at least one AuSS and possibly determining that one or more detected properties of the AuSS can be associated with the cell identity of the detected cell. For example, the WTRU may first identify the presence of a dormant cell from detecting AuSS according to examples disclosed herein, and may identify the cell identity of this dormant cell from properties of AuSS.

The WTRU may identify that the cell is in a dormant state if it has previously detected PSS/SSS but has been unable to detect other signals or channels from this cell, such as CRS or BCH, for a certain period of time prior to detecting PSS/SSS.

The dormant state of the cell may be indicated in system information, such as in a field of the master information block (MIB) or in a system information block (SIB).

A WTRU may indicate its presence, e.g., using a probing signal. Upon detecting a discovery signal or discovery resource and/or upon meeting a configured criterion or condition, the WTRU may initiate a transmission indicating its presence.

A WTRU may determine that a cell is in a dormant state but temporarily reactivated. For example, a WTRU, e.g., in an idle mode may make this determination after initial cell selection or cell reselection to such a cell. A WTRU, e.g., in a connected mode may make this determination when performing measurements, e.g., when it detects an AuSS or discovery signal while connected to a different cell and/or a cell of a different layer. When a WTRU determines that is under coverage of a cell that is in a dormant state but temporarily reactivated and the indication of presence or report has been triggered, the WTRU may perform one or more of a number of actions.

For example, the WTRU may indicate the transmission of a preamble on PRACH and/or may initiate a RACH procedure. The WTRU may select one of a plurality of PRACH configurations if, for example, the WTRU determines that PRACH partitioning is available for the cell and/or that a PRACH configuration is associated with the corresponding discovery resource or signal. As another example, the WTRU may select a PRACH resource (e.g., a subframe, a preamble format, a preamble, a set of PRBs, or the like) that may be dedicated to such a function that may be a configuration aspect, e.g., as indicated in a SIB, in a dedicated message, in a PDCCH order, etc. The WTRU may indicate within the RACH procedure (e.g., in msg1 or msg3) that the procedure may be performed for the purpose of indicating that the WTRU is under coverage of the cell. The WTRU may indicate within the RACH procedure additional information as disclosed herein. The WTRU may stop the retransmission of a preamble upon reception of msg2 that corresponds to a preamble that it has previously transmitted. It may also stop the RACH procedure, e.g., ignore the grant (if any) in the received msg2. This may occur if msg2 indicates that no grant is provided. For example, the transmission of a preamble may be used to implement some form of anonymous keep alive indication in which the concerned eNB may determine that at least one WTRU is under coverage of the concerned cell. The RACH procedure may be used as part of the subsequent procedures as per legacy WTRU behavior when establishing a SRB.

The WTRU may initiate a NAS procedure, such as a service request or tracking area update, which may trigger initiation of an RRC connection request procedure. This procedure may be used to implement some form of signed keep alive indication, in which eUTRA may determine the identity of the WTRU under the coverage of the concerned cell.

The WTRU may initiate an RRC connection request procedure to ensure that the cell detects the existence of the WTRU and does not return to a low activity state, even if an RRC connection does not need to be initiated for another reason, such as a service request or tracking are update. The WTRU may indicate that the cause of the connection is the detection that the cell is in a dormant state. This procedure may be used to implement some form of signed keep alive indication, in which eUTRA may determine the identity of the WTRU under the coverage of the concerned cell. When the WTRU completes one of the procedures disclosed herein, the WTRU may start a prohibit timer before the expiry of which the WTRU may not perform the above procedure for the purpose of keeping a cell out of a dormant mode, and which timer may be valid while the WTRU is operating on signals on the concerned cell, e.g., while the WTRU is camping or measuring reception of signals for the concerned cell.

The WTRU may detect a number of discovery signals that meet the reporting criteria in one layer. The WTRU may report in a measurement report one or more detected signals, e.g., all detected signals. However, if the WTRU sends an indication of presence to one of the cells, the WTRU may determine which cell to send the indication of presence or report based on one or more of a number of criteria. For example, the WTRU may select a cell associated with a discovery resource in which the best measurement quality was measured (e.g., highest signal strength). The WTRU may select a cell associated with a discovery resource with the lowest interference level. The WTRU may select a cell associated according to a configured cell priority.

Some examples disclosed herein may reduce or minimize the delay for a WTRU to get access to the resources of a small cell that may be in a dormant or low activity state. The examples may be used for a WTRU that may already be connected to a cell controlled by a macro eNB but not transferring data to/from that cell, or large amounts of data. When activity resumes, the network may identify that the WTRU is under coverage of a small cell in a low activity state using one or more of the examples disclosed herein and may bring the small cell in a normal activity state to serve the WTRU. The WTRU may perform a handover to the small cell or may be reconfigured to use the resources of the small cell while maintaining a connection to the cell of the macro eNB (e.g., dual connectivity). In some embodiments, the WTRU may have already been configured such that the small cell may be a secondary serving cell (Scell) that may be in a deactivated state or in an activated state. The WTRU may be configured with the small cell as its primary serving cell (Pcell).

As disclosed herein, the WTRU may perform different types of measurements (e.g., DS-RSRP, DS-RSRQ, SINR, etc.) on at least one discovery dignal, where a discovery signal may be configured in a discovery resource. It may also be indicated, for example, as part of the configuration, whether a discovery resource may correspond to a certain Scell of the WTRU configuration or to the Pcell. The discovery resource may be indicated as part of the corresponding Pcell or Scell configuration.

A WTRU may transmit a probing signal associated with a selected discovery resource upon an indication that activity is resuming. For example, the WTRU may transmit at least one probing signal when a triggering condition is detected. Different realizations for the probing signal and triggering condition may be disclosed herein. The reception of the at least one probing signal by neighboring cells (e.g., serving or non-serving), which may be dormant, may enable the network to quickly determine the cell that may serve the WTRU and that may be used for adjusting subsequent transmissions from the WTRU.

A triggering condition may include an explicit indication from the network, such as the detection of downlink control information (DCI) such as a PDCCH (or E-PDCCH) order for RACH, the reception of a MAC control element of a MAC activation command and/or a reconfiguration. For instance, the WTRU may trigger transmission of the probing signal if it receives a PDCCH/E-PDCCH order (e.g., with a certain set of values or a certain codepoint). The triggering condition may be the reception of any DCI specifically addressed to the WTRU, or the reception of PDSCH intended for the WTRU in a subframe or in a set of subframes. The triggering condition may be linked to a timer or variable of DRX, such as upon start of inactivity timer.

A triggering condition may be related to UL data arrival or UL data status. For instance, the triggering condition may be that a scheduling request has been triggered. The triggering condition may include a determination that an uplink grant is not configured. The triggering condition may be that a buffer status report (BSR) or a regular BSR has been triggered. More generally, the triggering condition may be dependent on the buffer size, data arrival or QoS requirement. For example, one or a combination of the following triggers may be used. A trigger may be or include that the buffer size of one or more logical channels, e.g., all logical channels, is above a threshold. A trigger may be or include that the buffer size of one or more logical channels, e.g., all logical channels, belonging to a specific logical channel group or a group of specific logical channel groups is above a threshold. A specific logical channel group may be a logical channel group for which the small cell layer can be used and accessed (e.g., configured or preconfigured). A trigger may be or include that UL data becomes available for transmission for a specific logical channel or a logical channel belonging to a specific logical channel group. A trigger may be or include that UL data becomes available or above a threshold for low priority logical channels. A trigger may be or include that the QoS of certain logical channels is not being met. A trigger may be or include that the PBR of a specific logical channel or a logical channel belonging to a specific logical channel group is not being met.

The triggering condition may be a reconfiguration with mobility (e.g., handover), for example, if indicated in the reconfiguration message. This may allow a target macro cell to determine if the WTRU is under coverage of a small cell in a low activity state.

The triggering condition may include a determination of the mobility state of the WTRU. For instance, the triggering condition may be met if the WTRU detects that it is in low mobility state, based on a count of handovers or a measurement of speed based on positioning or Doppler, for example.

The triggering condition may include a determination of an activity state of a cell (e.g., dormant or active, on or off) associated with a discovery resource. For instance, the triggering condition may be met if the WTRU detects that the cell associated with the discovery resource, whose configuration such as PCI and frequency may be provided along that of the discovery resource, is in a dormant or off state, based on determining that CRS from that cell is not transmitted.

A probing signal may comprise a random access preamble, a sounding reference signal (SRS), and/or a transmission that may have a structure similar to another type of UL transmission, such as PUCCH or PUSCH. It may also comprise another reference signal. If the probing signal is a random access preamble, it may be characterized by at least a PRACH configuration and a preamble index or a range of preamble indices to select from (e.g., as may be specified using a RACH-ConfigDedicated and/or RACH-Config-Common information element). The timing for the PRACH configuration may be based on the timing of the serving cell or the primary serving cell (Pcell). Alternatively, the timing may be based on the timing of the reception of a discovery signal. The probing signal may be transmitted as part of a random access procedure.

The WTRU may set properties of the probing signal (e.g., transmission time, power, and/or frequency) based on a selected discovery resource. At least one property of the probing signal may be determined based on a selected discovery resource or on a measurement performed on such resource. Such coupling between the probing signal and the discovery signal may facilitate detection of the probing signal by the relevant dormant cells.

If the WTRU is configured with more than one discovery resource, the discovery resource used for the determination of the at least one property may be selected as the one that increases or optimizes a certain measurement taken from that resource. For instance, the selected discovery resource may be the resource on which the maximum DS-RSRP (or DS-RSRQ or SINR) has been measured, or on which the minimum interference has been measured on an interference resource (e.g., CSI-IM). The selected discovery resource may be determined as the one identified as increasing or maximizing such a criterion at the time of transmission of the latest measurement report. The selected discovery resource may be determined as the one increasing or maximizing the criterion based on the latest available measurements from the WTRU irrespective of whether these measurements have been transmitted in a report. The selected discovery resource may be determined as the resource corresponding to the latest received discovery signal, in case signals corresponding to different resources are transmitted with different offsets and/or periods.

The property of the probing signal derived from the selected discovery resource may include one or more of timing, power, carrier frequency, resource block within a carrier, preamble index (e.g., for a probing signal based on PRACH), and/or Zadoff-Chu sequence (e.g., for a probing signal based on SRS or other RS). Some examples of property derivation may be disclosed herein. The carrier frequency where the probing signal is transmitted may be an UL carrier frequency linked to the DL carrier of the discovery resource. This UL carrier may be indicated as part of the discovery resource configuration, for example. Another example of property derivation may be the transmission power used for the transmission of the probing signal. For instance, the WTRU may determine the transmission power based on a formula that may include a path loss estimate PLD, such as the formula used for the determination of a preamble transmission power in existing systems:

$$P_{PR} = \min(P_{CMAX,c}, \text{PREAMBLE\_RECEIVED\_TARGET\_POWER} + PL_D) \text{ in dBm}$$

The path loss estimate PLD used in the above or other similar formulas may be determined from a measurement such as DS-RSRP taken from the selected discovery resource instead of the RSRP of the serving cell. For example, PLD may be determined as PLD=referenceSignalPower_discovery−DS-RSRP (in dB), where referenceSignalPower_discovery may be a parameter that may be indicated as part of the discovery resource configuration, for example. The measurement DS-RSRP may be filtered by higher layers similarly to RSRP.

The transmission timing of the probing signal may be determined based on the reception timing of a received discovery signal corresponding to the selected discovery resource. For instance, if the probing signal comprises a preamble, the transmission timing may be determined based on a frame timing determined at least in part from the reception timing of the discovery signal. For instance, the transmission time of the first probing signal may be determined as the first available PRACH resource from a PRACH configuration associated with the probing signal or with the selected discovery resource. The latest received discovery signal of the selected discovery resource may define the start of an even-numbered frame number for the purpose of determining the first available PRACH resource. Additional PRACH configurations, e.g., with a sparser pattern of PRACH resources in the time domain may be defined to allow a small cell eNB to turn off its receiver for a larger fraction of the time.

There may be several benefits in applying one or more of the examples disclosed herein where a property of the probing signal may be calculated based on a selected discovery resource. For instance, setting the power of the probing signal based on a path loss estimated from a discovery signal transmitted from a small cell instead of setting it to a fixed level (e.g., or maximum level) may avoid excessive interference while maintaining chances of successful detection to a reasonably high level. Setting the transmission timing of the probing signal based on a selected discovery resource may enable a network solution that may reduce or minimize battery consumption at the small cell eNB while at the same time minimizing interference between probing signals transmitted from WTRUs under coverage of neighboring small cell eNBs. In such a network solution, small cell eNBs controlling small cells that are part of a same cluster may be configured to monitor probing signals in non-overlapping sets of subframes. The network may assign the probing configuration (e.g., PRACH configuration) associated with the discovery resource corresponding to a given small cell in such a way that a WTRU selecting this discovery resource may transmit a probing signal at a time when the receiver for this small cell may be turned on. If a preamble (or a range of possible preambles to select from) is assigned for the probing signal, this may also allow the network to assign the same preamble (or range thereof) for all discovery resources (e.g., all small cells), thus saving resources.

The WTRU may start monitoring, e.g., on a continuous basis, a cell associated with the probing signal and/or the corresponding discovery resource after transmission of a probing signal or after the triggering condition for sending a probing signal occurred. The WTRU may also estimate channel state information (CSI) on a CSI resource or process that may be associated to the corresponding discovery resource and/or on the discovery resource itself, for example at least for initial CSI reports, among other scenarios. The configuration information of the cell (e.g., PCI, frequency, and/or other information) may be provided by higher layers along with the corresponding probing signal and/or discovery resource. The information may already be part of the configuration, for example in scenarios where the small cell may have already configured as Scell but may be deactivated, or as a Pcell, among other scenarios. The WTRU may assume that the timing at the SFN level is the same as the current serving cell or primary serving cell, for example, if so indicated from the configuration. Otherwise, the WTRU may start acquiring the SFN autonomously. In case of a RRC reconfiguration with mobility, if the WTRU has already transmitted a PRACH preamble as its probing signal, the WTRU may skip initiation of the regular RACH procedure and start monitoring the cell for a random access response message indicating reception of this preamble. The WTRU may apply the timing advance and transmit msg3 as in a regular RACH procedure, for example, upon successful reception of the message. In case the WTRU does not receive a random access response message before expiry of a timer started upon transmission of the probing signal, the WTRU may initiate a regular RACH procedure.

The transmission power of subsequent uplink transmissions associated with the above cell may be calculated based on a path loss estimate determined from a DS-RSRP measurement taken from the associated discovery resource. Such transmissions may include, for instance, PUSCH transmissions, such as msg3 (e.g., initial grant) and those resulting from subsequent uplink grants, PUCCH transmissions, and/or PUCCH transmissions. The WTRU may eventually start using a path loss estimate that may be determined from an RSRP measurement taken from the CRS of the cell, instead of the DS-RSRP. This transition may occur after the WTRU has measured CRS over a sufficient number of subframes, for instance over a measurement period of 200 ms. If L3 filtering is used, for example, the WTRU may then use the latest averaged DS-RSRP as the latest filtered value of the measurement and may update subsequent values of the filtered measurements based on this latest value. The WTRU may apply a correction factor to the transmission power to limit the variation caused by the change of path loss estimate to a maximum value.

The WTRU may transmit a sequence of probing signals until a stopping condition such as reception of a reconfiguration message occurs. The WTRU may transmit more than one probing signal, or a sequence of probing signals. For instance, the WTRU may be allowed to initiate transmission of a new probing signal with a power that may be increased compared to the previous probing signal if a timer started upon transmission of the previous probing signal has expired without a stopping condition occurring, and possibly if a maximum number of probing signal transmission has not been exceeded and/or a maximum power has not been exceeded. The stopping condition may comprise one or more of the reception of a reconfiguration message (for example, from the serving cell or primary serving cell) or the successful reception of PDCCH valid for the WTRU (such as a random access response or a WTRU-specific assignment) on a cell associated with the probing signal.

The WTRU may transmit a sequence of probing signals associated with multiple discovery resources. If the WTRU is configured with more than one discovery resource and/or a corresponding probing signal, the WTRU may initiate transmission of at least one probing signal for each of a subset of discovery resources. The subset of discovery resources may include, e.g., may be restricted to, those resources on which a measurement such as DS-RSRP, DS-RSRQ, or SINR is above a threshold, those resources associated with cells that are not detected to be in a active state, and/or those resources for which the latest signal has been received at a time not earlier than the current time minus a threshold. The WTRU may perform transmission of the probing signals using a priority order according to one or more of a number of criteria, which may include, for example, a largest value of measurement such as DS-RSRP, DS-RSRQ, SINR; an earliest time for which a probing resource is available; and/or an order in the configuration of discovery resources, or explicit priority index. The WTRU may cancel an upcoming transmission of a probing signal associated with a discovery resource if the stopping condition has been met, even if the stopping condition is not the reception of a PDCCH from a cell associated with the corresponding discovery resource.

The WTRU may initiate a RACH procedure to indicate completion of an reconfiguration procedure, for example, where a cell is added to an existing connection. For example, an RRC reconfiguration procedure may be defined to add resources from a cell that may be controlled by a different eNB than the eNB controlling the serving cell or primary serving cell of the WTRU. As part of such procedure, the WTRU may initiate a RACH procedure in the new cell from which resources are added. The information to initiate the procedure (e.g., RACH/PRACH configuration and other physical layer information) may be included in the reconfiguration message. The WTRU may include an RRC message such as an "RRC reconfiguration complete" message in the message 3 of the RACH procedure of the new cell (e.g., "First scheduled UL transmission on UL-SCH"). The procedure may complete after successful transmission of this message. The eNB controlling the new cell (e.g., SeNB) may detect that a WTRU, RRC controlled by another eNB (e.g., MeNB), is transmitting a message 3 for this purpose and may transparently forward the contents of the message 3 to the MeNB. The SeNB may determine the identity of the WTRU implicitly based on the preamble (e.g., resource) used for initiating the procedure, or the identity of the WTRU included as part of the message 3. The SeNB may determine the identity of the MeNB based on explicit information about the association with the WTRU. The identity of the MeNB or of the primary serving cell may explicitly be included into the message 3, or may be obtained using an example as disclosed herein.

A WTRU may process PDSCH in such a way that resource elements where AuSS is transmitted from the corresponding serving cell may not be used for PDSCH, for example, when receiving a downlink assignment or in other scenarios.

The WTRU may also be indicated an additional set of zero-power resources where PDSCH may not be used. This set of resources may be tied to possible AuSS transmissions in neighbor cells.

The WTRU may enable the network (e.g., SeNB) to determine its identity when performing an initial access to the resources of a cell of the SeNB. The WTRU may use parameters either provided by the MeNB (e.g., MeNB-controlled) or used by the WTRU for its operation with the MeNB (e.g., WTRU-autonomous, SeNB-controlled).

The SeNB may know a priori how to determine the identity of the WTRU, for example, if the parameters are provided by the MeNB. The MeNB and the SeNB may perform coordination such that the WTRU may access the SeNB and the SeNB may determine the identity of the WTRU. For this case, a procedure based on either a contention-based random access or on a contention-free access on PRACH of the SeNB may be disclosed.

The SeNB may receive the transmission from the WTRU, determine that the transmission may correspond to a WTRU that is already connected to a cell of another eNB (e.g., MeNB) and resolve the identity of the WTRU, e.g., by interaction with the MeNB, for example, if the parameters are used by the WTRU for its operation with the MeNB. For example, the SeNB may receive a request and resolve the identity of the WTRU. For this case, a procedure based on either a contention-based random access or on a contention-free access on PRACH of the SeNB may be disclosed.

For either case, separate PRACH resources may be used for WTRUs that are already connected to a cell of another eNB to reduce or minimize collisions and/or to indicate to the network that the access is not for a connection establishment but, for example, for a reconfiguration of dual connectivity.

The WTRU may access a cell according to one of the methods described herein. For example, the WTRU may apply a method if it supports dual connectivity (e.g., the use of resources associated with different eNBs using a single RRC connection). In such a case, the WTRU may have an established RRC connection with a first eNB (e.g., an MeNB) and may use the resources of at least a first cell associated with the MeNB. The WTRU may apply such methods if it has received a configuration (e.g., from the MeNB).

While methods may be described herein in terms of network-control and WTRU-control, the methods described herein are not limited to the respective scenarios. For example, although the use of the C-RNTI assigned for the operation towards the MeNB may be used when the WTRU autonomously accesses a cell of the SeNB, including a possible reassignment during or following the completion of the access procedure, a similar behavior may be applicable for the case where a MeNB-controlled access is performed in a similar manner.

A preamble may be transmitted in a contention-free access. The WTRU may determine that the random access procedure is successful from the reception of a RAR on the resources of the cell of the SeNB, e.g., by reception of RAR scheduled by a DCI scrambled with RA-RNTI on PDCCH of the SeNB. For example, the WTRU may determine that the random access procedure is successful if the RAR includes a temporary C-RNTI field having a value set to a RNTI configured by control signaling received from the MeNB. The WTRU may determine that the random access procedure is successful from DCI reception with C-RNTI equal to a C-RNTI assigned by the MeNB. The WTRU may determine that the preamble transmission is successful from the reception of a DCI format scrambled by C-RNTI received on PDCCH of the SeNB. Such DCI may correspond to a transmission that includes a MAC TAC control element (CE).

A preamble may be transmitted in a contention-based access. A msg3 may include a C-RNTI MAC control element (CE) with a C-RNTI equal to a C-RNTI assigned by the MeNB. The WTRU may receive a RAR that may include a grant for the transmission of msg3. The WTRU may include a C-RNTI MAC control element with the value of the C-RNTI field set to a RNTI configured by control signaling received from the MeNB. The WTRU may determine that the procedure is successful from the reception of a DCI format scrambled by the C-RNTI and received on PDCCH of the SeNB.

There may be WTRU triggers for cell access, which may include MeNB-controlled cell access, SeNB-controlled cell access, WTRU-autonomous cell access, and/or combinations with other methods described herein.

MeNB-controlled cell access may involve an MeNB-controlled trigger and/or access to a cell of an SeNB. The WTRU may receive control signaling from a first eNB (e.g., a MeNB) that may trigger an access to a cell of a second eNB (e.g., a SeNB). Such signaling may comprise L3/RRC signaling, such as the reception of an RRC reconfiguration message that adds at least one cell of the SeNB to the WTRU's configuration.

A MAC control element (CE) may be received in a first MAC instance that may trigger a procedure in a second MAC instance, e.g., preamble transmission/RACH (e.g., cross-eNB MAC-based RACH trigger). This signaling may comprise an L2/MAC control element that may activate at least one cell associated with an SeNB in the WTRU's configuration. Such activation may trigger an access using a random access procedure to the cell of the SeNB.

MeNB-controlled cell access may involve a PDCCH order similar to an SCell RACH trigger. This may involve the reception of L1 signaling by a first PHY layer and/or MAC instance that may trigger a procedure in a second MAC instance, e.g., preamble transmission/RACH (e.g., cross-eNB L1-based PDCCH RACH order). Such signaling may include reception of L1/PDCCH signaling that may trigger an access using a random access procedure to a cell of a second eNB.

Control signaling may indicate contention or contention-free access. This example may involve the reception of L1 and/or L2 signaling by a first instance, which may pass a set of parameters to a second MAC instance, e.g., for preamble transmission/RACH. The signaling may include an RNTI applicable to the MAC instance associated with the second eNB, if different than the one of the first MAC instance. The signaling may include parameters for the transmission of a preamble. The parameters may include a dedicated PRACH resource and/or preamble. The parameters may allow the WTRU to perform a contention-free access.

The WTRU may have an established RRC connection to a MeNB. The WTRU may determine that at least one cell of another eNB is suitable for access. The WTRU may report this to the network, e.g., using a measurement report. For example, the WTRU may include or indicate the state of the cell in the measurement report.

As another example, MeNB-controlled cell access may involve an MeNB-controlled trigger by L1 and/or CF access to cell of SeNB. This may involve a combination of an assignment of a RNTI (which may be, e.g., WTRU-specific or MAC layer-specific) with the verification of the temporary C-RNTI matching either the C-RNTI associated with the MAC of the MeNB, with the C-RNTI associated with the MAC of the SeNB, or both, in case the RAR may be extended to include both.

The WTRU may receive on a PDCCH of a cell of the MeNB a DCI that may instruct the WTRU to initiate a random access procedure on the resources of a cell of the SeNB. Such a configuration may include a specific PRACH resource (e.g., preamble, PRACH resource/occasion, etc.) and/or an RNTI for operation in the cell of the SeNB.

The WTRU may initiate the transmission of a preamble using PRACH resources of a cell of the SeNB. The WTRU may monitor the PDCCH for a RAR using the RA-RNTI applicable to the preamble transmission. The WTRU may consider the procedure successful upon reception of the RAR message. The WTRU may consider the procedure successful upon reception of the RAR message with the field for the temporary C-RNTI indicating the value of the concerned RNTI. The C-RNTI may be configured for the corresponding MAC instance.

This example may be based on the combination of an assignment of a RNTI, which may be WTRU-specific or MAC layer-specific, with the reception of a RAR scheduled with the C-RNTI associated with the MAC of the SeNB.

The WTRU may consider the procedure successful if it receives a transmission by PDCCH scrambled by the C-RNTI configured for the corresponding MAC instance. Such transmission may include a RAR message or a MAC CE such as a MAC TAC CE.

The SeNB may determine the identity of the WTRU using the preamble reception (e.g., in case contention-free parameters are used, e.g., a dedicated PRACH resource in time/frequency is used, and/or using a dedicated preamble).

MeNB-controlled cell access may involve a MeNB-controlled trigger by L1 and/or CB access to a cell of an SeNB. This may involve a combination of an assignment of an RNTI, which may be WTRU-specific or MAC layer-specific, with the reception of RAR without consideration for the temporary C-RNTI, and with the WTRU including in msg3 a C-RNTI MAC control element (CE) for the case where the procedure is initiated by the network. The C-RNTI may be either the C-RNTI associated with the MAC of the MeNB, with the C-RNTI associated with the MAC of the SeNB, or both (e.g., in case either the MAC CE is extended to include both or the MAC PDU may include multiple C-RNTI MAC CEs). msg3 may also include information that identifies the MeNB, e.g., physical cell identity or the like.

The WTRU may receive on a PDCCH of a cell of the MeNB a DCI that may instruct the WTRU to initiate a random access procedure on the resources of a cell of the SeNB, which preamble transmission is not assumed to be contention-free.

The WTRU may initiate the transmission of a preamble using PRACH resources of a cell of the SeNB. The WTRU may then monitor the PDCCH for a RAR using the RA-RNTI applicable to the preamble transmission. The WTRU may successfully receive a RAR message. The WTRU may ignore the temporary C-RNTI field, e.g., the WTRU may not consider the field as an assignment for its PDCCH decoding. The WTRU may use the C-RNTI configured for the concerned MAC instance and previously received using the resources of the MeNB. When the WTRU receives a RAR with a grant for a transmission of msg3, the WTRU may include a C-RNTI MAC control element in msg3, which may indicate the RNTI value received from the MeNB. The WTRU may consider the procedure successful upon reception of a PDCCH addressed to the C-RNTI associated with the concerned MAC instance.

The SeNB may determine the identity of the WTRU using the preamble reception and the subsequent reception of msg3 with the C-RNTI MAC command element (CE) with the value set to the RNTI value configured and/or indicated by the MeNB. This may be performed, for example, in combination with either a MAC CE (e.g., if no SRB is used towards the SeNB for dual connectivity) or an RRC message (e.g., otherwise) that may include at least one aspect that may enable the SeNB to determine the identity of the concerned MeNB, e.g., such as one or more of physical cell identity, global cell identity, and/or carrier frequency of the cell associated with the WTRU's RRC Connection to the MeNB.

MeNB-controlled cell access may involve a combination with cell on/off mechanisms. For any of the methods disclosed herein, the WTRU may detect at least one suitable cell of a second eNB. If the cell is in a dormant state, the WTRU may perform further actions as disclosed herein. The cell may then be assumed to be accessible to the WTRU. The WTRU may report this accessibility to the network, e.g., using a measurement report. For example, the WTRU may include or indicate the state of the cell in the measurement report.

SeNB-controlled cell access may involve an SeNB-controlled trigger and/or access to cell of SeNB. The WTRU may receive control signaling from a first eNB (e.g., a MeNB) that may trigger monitoring of PDCCH of a cell of a second eNB (e.g., a SeNB) for a subsequent trigger, such as a trigger for a preamble transmission. This signaling may include L3/RRC signaling, such as the reception of a RRC reconfiguration message that adds at least one cell of the SeNB to the WTRU's configuration.

The signaling may involve a MAC control element (CE) similar to a MAC SCell activation or deactivation. This example may be based on the reception of the MAC CE in a first MAC instance that may trigger a procedure in a second MAC instance, e.g., PDCCH monitoring (e.g., cross-eNB MAC-based cell activation). This signaling may include an L2/MAC CE that may activate at least one cell associated with an SeNB in the WTRU's configuration.

SeNB-controlled cell access may involve the WTRU detecting that a cell is accessible, e.g., following a procedure that activates the cell. The WTRU may determine that a cell is accessible and may initiate monitoring of PDCCH of a cell of a second eNB (e.g., a SeNB) for a subsequent trigger, such as a trigger for a preamble transmission.

For example, if the concerned cell is in a state (e.g., dormant, off) in which access may not be immediately possible, the WTRU may first transmit a probing signal and subsequently determine, e.g., using the applicable method that the resources are available. The method may include reception of broadcast signals such as PSS/SSS, system information, and/or explicit confirmation that the cell is accessible.

SeNB-controlled cell access may involve a PDCCH order similar to a PCell RACH trigger. The WTRU may receive a DCI on PDCCH using the RNTI applicable to the concerned MAC instance. Such DCI may trigger a random access procedure on the resources of the cell of the SeNB similar to the legacy procedure used for a PCell.

WTRU-autonomous cell access may involve a WTRU-autonomous trigger and/or CB access of a cell of an SeNB. The WTRU may determine a cell is accessible. An on/off method may be used to activate a cell. The WTRU may determine that a cell is accessible and may autonomously initiate an access to a cell of the second eNB. For example, if the concerned cell is in a state (e.g., dormant, off) in which access may not be immediately possible, the WTRU may first transmit a probing signal and subsequently determine, e.g., using the applicable method that the resources are now available. The method may include reception of broadcast signals such as PSS/SSS, system information, and/or explicit confirmation that the cell is accessible.

The WTRU may first determine that a cell may be accessible, e.g., based on pre-configuration. The WTRU may determine that a cell may be accessible, e.g., for dual connectivity. The WTRU may determine this accessibility based on its configuration, such as if the WTRU is configured for operation in the concerned cell. The WTRU may determine that a cell may be accessible based on reception of system information. The WTRU may receive system information before attempting an access to the concerned cell.

The WTRU may have an established RRC connection to a MeNB. The WTRU may determine that at least one cell of another eNB may be suitable for access. The WTRU may report such to the network, e.g., using a measurement report. For example, the WTRU may include or indicate the state of the cell in the measurement report.

WTRU-autonomous cell access may involve WTRU-autonomous CB access to a cell of an SeNB. This may involve a combination of using a RNTI assigned to a first MAC instance, which may be WTRU-specific and assigned by a MeNB, with the reception of RAR without consideration for the temporary C-RNTI, and/or with the WTRU including in msg3 a C-RNTI MAC CE for the case where the procedure is initiated autonomously by the UE. The C-RNTI may be the C-RNTI associated with the MAC of the MeNB. msg3 may also include information that may identify the MeNB, e.g., physical cell identity or the like.

The WTRU may initiate the transmission of a preamble using PRACH resources of a cell of the SeNB. Such resources may be obtained from reception of the system information broadcast. The WTRU may monitor the PDCCH for a RAR using the RA-RNTI applicable to the preamble transmission. The WTRU may successfully receive a RAR message. The WTRU may ignore the temporary C-RNTI field, e.g., the WTRU may not consider the field as an assignment for its PDCCH decoding. The WTRU may use the C-RNTI assigned by the MeNB (e.g., for the MAC instance associated with the MeNB). When the WTRU receives a RAR with a grant for a transmission of msg3, the WTRU may include a C-RNTI MAC control element in msg3 that may indicate the RNTI value assigned by the MeNB. The WTRU may consider the procedure successful upon reception of a PDCCH addressed to the C-RNTI associated with the concerned MAC instance. A longer contention resolution timer may be used and may be indicated in the broadcasted system information. The length of the contention resolution timer may at least cover the time expected for the SeNB to coordinate with the MeNB such that the WTRU may be identified. Contention may be resolved by the WTRU before the network has resolved the identity of the WTRU, in which case the WTRU may simply monitor PDCCH until the WTRU successfully decodes a DCI with the corresponding RNTI, and/or until the WTRU receives a reconfiguration (e.g., from the MeNB if SRB terminates in the MeNB or from the SeNB otherwise) that may configure the concerned cell of the SeNB and that may assign a new C-RNTI for the concerned MAC instance.

The SeNB may determine the identity of the WTRU using the preamble reception and the subsequent reception of msg3 with the C-RNTI MAC CE with the value set to the RNTI value configured and/or indicated by the MeNB. This may be done in combination with a MAC CE (e.g., if no SRB is used towards the SeNB for dual connectivity) and/or an RRC message (e.g., otherwise) that includes at least one aspect that may enable the SeNB to determine the identity of the concerned MeNB, e.g., such as one or more of physical cell identity, global cell identity, and/or carrier frequency of the cell associated with the WTRU's RRC Connection to the MeNB.

The WTRU may also include a token that may enable the network to confirm its identity. Such token may include, e.g., a shortMAC-I computed on a previous transmission of the WTRU to the MeNB. Such message may be, e.g., an RRC PDU or part thereof, in which case the WTRU may additionally send a corresponding transaction identity. The token may include a string of information that may be shared between the MeNB and the WTRU. The string may be configured by the MeNB to the WTRU prior to its access to the SeNB. The token may be transmitted by the WTRU using a security function applicable to a transmission with the MeNB.

Cell access may involve a combination with other methods described herein, such as cell dormant on/off mechanisms. For any of the procedures disclosed herein, the WTRU may first determine that the concerned cell is in a dormant state. The WTRU may perform a procedure to activate the cell. The WTRU may perform a combined procedure where the transmission of the preamble for the initial access may also serve as a probing and/or activation signal for the dormant cell, such as using mechanisms disclosed herein. In this case, the applicable timers and windows (e.g., Random Access Response window) may be extended e.g. by a factor such as an integer multiple. The WTRU may determine and/or get further confirmation that the cell is activated from the reception of a RAR associated with a preamble transmitted by the WTRU.

Radio link monitoring and/or measurements may be performed when a cell-specific reference signal (CRS) may not be present, e.g., a cell-specific reference signal may not be received in all subframes or in known subframes. For example, a cell may apply discontinuous transmission (DTX) or on/off operation on a subframe basis or over certain periods of time. Measurements may include radio resource management (RRM) managements, such as RSRP, RSRQ, DS-RSRP, and/or DS-RSRQ. Measurements may be performed to identify signals that may be used for estimating long-term channel properties (e.g., timing, Doppler) for assisting PDSCH demodulation, e.g., measuring for quasi-colocation (QCL) demodulation assistance. Such measurements may be referred to as channel estimation measurements or demodulation assistance measurements. Some measurements may be performed for coarse time and frequency synchronization.

An eNB may dynamically switch between transmitting a discovery signal and CRS. For example, an eNB may transmit a CRS when it has a WTRU or WTRUs connected and may transmit the discovery signal when it does not have any connected WTRUs. In an example, an eNB may transmit a CRS when it transmits data to one or more WTRUs, and may not transmit CRS otherwise. An eNB may transmit a discovery signal (e.g., may always transmit a discovery signal) and may transmit the CRS when it has a connected WTRU or when it transmits data to one or more WTRUs. An eNB may transmit the discovery signal when it does not have any downlink data to transmit (e.g., even if there are still connected WTRUs present) and may transmit the CRS when it has a downlink data transmission. The eNB may transmit (e.g., may always transmit) the discovery signal and may transmit the CRS if it has downlink data to transmit. The discovery signal may be transmitted in a subset of subframes (e.g., only), e.g., in a sparse manner. The discovery signal may include at least one signal among PSS, SSS, CRS, CSI-RS, and/or PRS, which may be transmitted in one or more symbols and/or subframes.

A WTRU may determine a type of signal that may be used for radio link monitoring, demodulation assistance, and/or RRM measurements. For example, a WTRU may determine that a CRS or discovery signal may be monitored based on the detection of the presence or of a specific property of a synchronization or reference signal (e.g., PSS/SSS or AuSS or CRS).

The WTRU may monitor the downlink radio link quality and/or perform demodulation assistance measurements and/or RRM measurements based on a discovery signal, such as an AuSS or other types of signals, and possibly other resources, instead of or in addition to the cell-specific reference signal (CRS), as described herein.

The WTRU may determine the signal used for radio link monitoring, demodulation assistance measurements, and/or RRM measurements based on the state of a cell as described herein.

For determining radio link quality, the WTRU may estimate interference based on an interference measurement resource (RL-IM), which may have a similar or identical structure as a CSI-IM resource. This resource may be provided by RRC signaling.

The WTRU may monitor the downlink radio link quality based on the CRS, and/or perform RRM measurements such as RSRP, RSRQ based on the CRS, and/or perform demodulation assistance measurements based on the CRS over subframes where CRS is determined to be present or to have been transmitted, e.g., only over such subframes.

The WTRU may determine whether CRS was transmitted in a subframe. For example, the WTRU may determine whether CRS was transmitted in a subframe based on whether the WTRU has received an indication from the network that CRS is transmitted in the cell, possibly over a specified subset of subframes. This indication may be received from a physical layer, MAC or RRC signaling (e.g., dedicated or broadcast). For instance, the indication may include a DCI received from PDCCH or E-PDCCH in a previous subframe, which may indicate the presence of CRS for a set of M consecutive subframes starting at N subframes after reception of the DCI, or according to some other subframe pattern starting at N subframes after reception of the DCI.

The WTRU may determine whether CRS was transmitted in a subframe based on whether one or more of a number of events has occurred for the subframe or since the beginning of an evaluation period for thresholds Qout or Qin. An event may be that the WTRU may detect the presence of CRS based on determining that the signal strength of the CRS is above a threshold (e.g., for at least one subframe or a number of subframes). An event may be that the WTRU may detect the presence of synchronization signals such as PSS/SSS indicating a cell identity corresponding to that of CRS, within a period of time. For instance, the WTRU may assume that CRS is transmitted for at least 50 ms following the reception of PSS/SSS. An event may be that the WTRU may detect the presence of one or more synchronization signals such as AuSS with a property indicating that CRS is not being transmitted (e.g., a dormant cell), or the WTRU may detect detected the presence of the discovery signal. An event may be that the WTRU has decoded downlink control information, for example, from PDCCH or E-PDCCH. An event may be that the WTRU has received a PDSCH assignment in the same subframe or in a previous subframe within the last N subframes.

The WTRU may determine that CRS is transmitted in a subframe based on whether the measured signal strength is above a threshold. The threshold may be an absolute value or may be a value relative to the signal strength (e.g., RSRP) or quality (e.g., RSRQ) of a second signal, such as a PSS, SSS, or DRS of the (serving) cell, measured in at least one subframe where the second signal may be known to be present. For example, the threshold may be K dB below the measured RSRP of the cell, where RSRP may be measured based on a discovery signal. The value of K may be predefined or configured by higher layers. The value of K may be modified, e.g., in an adaptive manner based on a target percentage of false alarm detections.

The WTRU may monitor the downlink radio link quality based on the CRS and/or may perform RRM measurements based on the CRS and/or measure CRS for demodulation assistance when one or a combination of a number of conditions is met. A condition may be that the WTRU has received an indication from the network that the CRS may be used for radio link monitoring and/or RRM measurements or demodulation assistance measurements, e.g., for a specified subset of subframes. This indication may be received from a physical layer, MAC or RRC signaling (e.g., dedicated or broadcast). A condition may be that the timer T310 has been started or is running. A condition may be that the inactivity timer used for DRX is running or that the WTRU is in Active time. A condition may be that the WTRU has indicated that it is indicated out-of-sync to higher layers (e.g., or the last indication to higher layers is out-of-sync). A condition may be that the WTRU may detect that the discovery signal is not present or no longer present. This detection may be based on determining that the radio link quality and/or a measurement based on the discovery signal has fallen below a threshold or has changed by an amount larger than a threshold. This detection may be determined from detecting that a synchronization signal such as PSS/SSS or AuSS is not or is no longer transmitted or may be based on a property of a detected PSS/SSS or AuSS or discovery signal, such as a position in a time or frequency domain, a Zadoff-Chu base sequence, or the like.

The WTRU may monitor the downlink radio link quality based on a discovery signal, or may measure a discovery signal for demodulation assistance or for RRM measurements, for example, when one or a combination of a number of conditions is met, or in other scenarios. A condition may be that the WTRU has received an indication from the network that the discovery signal may be used for radio link monitoring or QCL demodulation assistance, e.g., for a specified subset of subframes. This indication may be received from a physical layer, MAC or RRC signaling (e.g., dedicated or broadcast). A condition may be that the WTRU may determine that the CRS is not present or no longer present (e.g., based on conditions disclosed herein, e.g., if the subframe is not part of a subset of subframes indicated by reception of DCI). This detection may be based on determining that the radio link quality and/or a measurement based on the CRS has fallen below a threshold, or has changed by an amount larger than a threshold. This detection may be determined from detecting that a synchronization signal such as PSS/SSS or AuSS is not (or no longer) transmitted, or based on a property of a detected PSS/SSS or AuSS. A condition may be that the WTRU may detect the presence of one or more synchronization signals such as PSS/SSS or AuSS or discovery signal with a property indicating that the discovery signal is being transmitted.

Radio link quality estimation and RRM measurements and demodulation assistance measurements may be based on a combination of signals measured over an evaluation period or measurement period.

An estimate (e.g., a single estimate) of the radio link quality over an evaluation period may be performed based on a combination of signals and/or resources of possibly different types. This estimate may be compared to the thresholds Qout and Qin for the determination of the indication in-sync or out-of-sync to higher layers. For instance, if the WTRU has determined that both the discovery signal and CRS are used (e.g., in subframes where they are determined to be present) for the determination of radio link quality in the evaluation period, the WTRU may calculate an estimate (e.g., a single estimate) of the radio link quality based on both signals. The WTRU may indicate in-sync to higher layers in case the radio link quality from this estimate becomes higher than the threshold Qin, and may indicate out-of-sync to higher layers case the radio link quality from this estimate becomes lower than the threshold Qout.

Measurements such as RSRP or RSRQ may be based on a combination of signals and/or resources of possibly different types over a given measurement period. A WTRU may, for instance, average measurement estimates taken from signals of different types (e.g., CRS and/or discovery signal) over the measurement period and/or maintain a moving average based on measurement samples of different types over a duration corresponding to a measurement period.

In-sync and out-of-sync indications may be based on radio link quality estimates that may be separately determined for each type of signal. Separate estimates of the radio link quality may be performed based on each type of signal, for example, over different evaluation periods. For instance, the WTRU may determine an estimate of the radio link quality based on a discovery signal (Qd) and may separately determine an estimate of the radio link quality based on CRS (Qc), if available.

The evaluation periods for Qd and Qc may be set to be equal. The WTRU may indicate in-sync to higher layers if either Qd or Qc becomes higher than the threshold Qin (or, for example, if both Qd or Qc become higher than the threshold Qin). The WTRU may indicate out-of-sync to higher layers if both Qd and Qc become lower than the threshold Qout.

The WTRU may determine an estimate for a single type of signal (e.g., Qd) unless the quality for this signal is below a threshold (e.g., either Qout or Qin or another threshold). When the quality for the signal falls below a threshold, the WTRU may initiate radio link quality estimation based on another type of signal (e.g., Qc) or based on a combination of signals as disclosed herein, if available. The WTRU may (e.g., immediately) indicate out-of-sync to higher layers, for example, if the quality estimated from the first type of signal had become lower than the threshold Qout. The WTRU may indicate out-of-sync if the estimated quality based on the second type of signal (Qc) or the combination of signals is determined to be also below the threshold Qout following the evaluation period. Subsequent indication of in-sync or out-of-sync may from this point be based on the estimated quality based either or both of the first and second types of signal, or the combination of signals. For instance, the WTRU may indicate in-sync to higher layers in case either (or both) Qd or Qc becomes higher than the threshold Qin.

The WTRU may stop radio link quality estimation based on the second type of signal (or the combination of signals) and revert to monitoring of the first type of signal, when the quality for the first signal (Qd) becomes higher than the threshold. The WTRU may do this upon expiration of a timer started when radio link quality estimation based on the second type of signal was started, if the timer was not stopped by the indication of the threshold Qout or the threshold Qin to higher layers.

Measurements may be independently determined for each type of signal. For example, a WTRU may measure measurements such as RSRP or RSRQ independently for each type of signal, e.g., for the discovery signal and the CRS. A type of signal may be intrinsically associated with the state of a cell, e.g., either dormant or active. The WTRU may determine which measurement value is used for L3 filtering and subsequent triggering and reporting based on a function of the measurement values obtained for each type of signal. For instance, the WTRU may estimate a first RSRP value (RSRP_c) based on CRS and a second RSRP value (RSRP_d) based on a discovery signal, in a measurement period. The WTRU may determine that the RSRP value for the measurement period is, for example, the maximum, the minimum, or the average between the two values.

The WTRU may select and use different signals from one measurement period to another. The selection of the signal or the set of signals may be based on one of the examples disclosed herein. The WTRU may perform L3 filtering of the measurements taken from different periods irrespective of the signal or set of signals used in each measurement period. A WTRU may be preconfigured with different measurement report triggers depending on the type of reference signal used for the measurement.

The WTRU may indicate the type of reference signal in the measurement report. For example, upon transmitting a measurement report, a WTRU may indicate the reference signal or set of reference signals used for each measurement. For example, when transmitting a measurement report, the WTRU may indicate the measurement identity associated with the reference signal used for the measurement. The reference signal may itself indicate whether the state of the cell is dormant or active. This may indicate to the eNB whether a cell (e.g., a neighboring cell) is on or off and may help to determine whether handing over the WTRU is applicable or whether the cell may be added to the WTRU's configuration.

The eNB may indicate to the WTRU the type of reference signal or reference signals that the WTRU may use for radio link monitoring and/or measurements. For example, the eNB may modify a SIB to indicate the type of reference signal (e.g., discovery and/or CRS) that may be used for radio link monitoring. The eNB may transmit a PDCCH or E-DPCCH indicating to connected WTRUs the reference signal to be used for future radio link monitoring. Such a PDCCH or E-DPCCH may be transmitted in common search space and may use a group RNTI assigned to all connected WTRUs. The eNB may transmit a paging message indicating to an idle WTRU (e.g., all idle WTRUs) the reference signal the WTRU may use for measurements.

An on or off state of a cell may be indicated. A cell may be in an on state or in an off state. Such a cell state may be indicated to a WTRU. WTRU behavior may depend on the state of a cell. For example, a WTRU may be preconfigured with different sets of parameters depending on whether a cell is in the on state or in the off state. The parameters may include, for example, resources (e.g., subframes, REs, PRBs, bandwidth, and/or subframe subsets) that may be used for higher layer measurements and resources used to report such measurements; resources (e.g., subframes, REs, PRBs, bandwidth, and/or subframe subsets) that may be used for CSI measurement and resources used to report CSI feedback; QCL assumptions to be made by the WTRU; cell bandwidth; resources used for different signals such as discovery signal (DRS), CRS, CSI-RS, CSI-IM, PRS, PSS/SSS, and/or PBCH; cell ID and/or virtual cell ID; and/or DL transmission power.

A cell may indicate its state to its served WTRUs or any WTRUs capable of receiving such a message. Such an indication may be sent periodically. For example, a WTRU may include with the discovery reference signal (DRS) or within a preconfigured time period from the transmission of a DRS an indication of the state of the cell. The state of the cell may be sent aperiodically. A WTRU may be configured to monitor for such possible state indication. The state of a cell may be provided to the WTRUs in one or more of an element in one of the SIBs; a paging message; a PDCCH or E-PDCCH using a group RNTI; and/or a parameter (e.g., timing, RE location, sequence, OCC, and/or cyclic shift) of a signal, such as the DRS.

The state indication may include a notification of an impending state change. For example, a cell in the off or on state may (e.g., periodically) transmit a signal that may indicate that it is in the off or on state. The signal may include an indication informing the WTRUs that it will soon be changing states and entering the on or off state. An indication of cell state change may also include timing for when the cell may change states. There may be preconfigured moments (e.g., frames and/or subframes) when a WTRU may change states. At any moment, a cell may transmit an indication of an upcoming cell state change, with the understanding that the change may occur (e.g., may only occur) at an allowed and preconfigured cell state change moment. The preconfigured allowed cell state change times may be broadcast and may be configured via SIB or any higher layer signaling. The indication of an upcoming cell state change may be provided via one or more of paging (e.g., using a dedicated P-RNTI to indicate a cell state change); a PDCCH or E-PDCCH using a group RNTI; and/or an aperiodic transmission of a discovery signal.

The indication may include a cell state change message. The WTRU may know the previous state to know the future state. The indication of state may explicitly identify the future or current cell state to ensure that there is no ambiguity.

A WTRU may implicitly determine the state of the cell based on the presence or absence of a DRS or of a CRS. For example, a WTRU may detect a DRS or a CRS and may infer that the cell is in the off state. The WTRU may determine that a signal is present based on whether the measured signal strength of the signal is above a threshold. The threshold may be an absolute value or may be a value relative to the signal strength (e.g., RSRP) or quality (e.g., RSRQ) of a second signal, such as a PSS, SSS, or DRS of the (serving) cell, measured in one or more subframes where the second signal may be known to be present. For example, the threshold may be K dB below the measured RSRP of the cell, where RSRP may be measured based on a discovery signal. The value of K may be predefined or configured by higher layers. The value of K may be modified, e.g., in an adaptive manner based on a target percentage of false alarm detections.

Knowledge of the state of a cell may enable a WTRU to perform appropriate and state-specific measurements. For example, a WTRU may perform RLM on the DRS if a cell is in the off state and may perform RLM on the CRS if the cell is in the on state.

A WTRU may be configured with discontinuous reception (DRX) to conserve battery power. Upon expiration of an inactivity timer, a WTRU may enter DRX. The WTRU's serving cell may be in an on state or in an off state. The serving cell may change states while the WTRU is inactive. To ensure that the WTRU is aware of the state of the cell when it enters active time, the cell may ensure that any update of its state (e.g., an explicit indication of its state or an indication of a change in state, e.g., a future change in state) may be transmitted when the served WTRUs are in active time.

WTRUs may be configured with another DRX pattern (e.g., a cell state DRX pattern or occasion pattern) that may overlap the short and long DRX patterns. Such a cell state DRX pattern may enable the WTRU to wake up when an update of the cell state may be transmitted. A WTRU that wakes up to listen for a potential update of the cell state may listen for such an update, e.g., and not for any other PDCCH or E-PDCCH message. For example, upon receiving an update of the cell state, the WTRU may return (e.g., immediately) to an inactive mode. Upon receiving an update of the cell state, the WTRU may begin an inactivity timer and listen for any other downlink transmission. Failure to receive any such transmission before the inactivity timer expires may allow the WTRU to return to the inactive mode. The cell state DRX pattern may make the WTRU active for a fixed period of time, e.g., regardless of if or when it has received an update of the cell state.

The WTRU may be unable to receive an update of cell state. For example, it may not be able to decode the cell state, or the update may have been transmitted while the WTRU was inactive. The WTRU may autonomously determine the cell state upon waking up from short or long DRX. Upon waking up from short or long DRX, the WTRU may determine the state of a cell by assuming that the cell has the same state as when the WTRU entered the inactive mode. The WTRU may behave (e.g., attempt of take measurements, attempt to decode PDCCH or E-PDCCH, etc.) according to the method prescribed for the state that the cell was in when the WTRU entered the inactive mode. Upon taking a measurement on the appropriate signal based on the WTRU's assumption of the cell state, the WTRU may compare it to a last measurement taken while in active time. If the difference between the measurement and the previous active time measurement is greater than a threshold value, the WTRU may autonomously assume that the state of the cell has changed and that measurements may be taken on a signal appropriate for a new state assumption. Upon determining that a new measurement is different from a previous measurement by at least a threshold value, a WTRU may wait for a next cell state indication before making any further assumptions as to the state of the cell. Upon determining that a new measurement is different from a previous measurement by at least a threshold value, the WTRU may begin cell reselection.

The WTRU may determine the state of a cell by assuming that the cell is off. The WTRU may attempt to detect a discovery signal. Failure to detect a discovery signal, e.g., within a preconfigured amount of time, may lead the WTRU to assume that the cell is on and to attempt to detect a CRS signal, or may lead the WTRU to determine that radio link failure has occurred and perform related actions.

The WTRU may determine the state of a cell by assuming that the cell is on. The WTRU may attempt to detect a CRS signal. Failure to detect a CRS signal, e.g., within a preconfigured amount of time, may lead the WTRU to assume that the cell is off and to attempt to detect a DRS, or may lead the WTRU to determine that radio link failure has occurred and perform related actions.

The WTRU may remain active until it has received an indication of the state of the cell. The WTRU may be configured to behave in this manner on a subset of active time periods. For example, the WTRU may be configured to remain active until it successfully determines the state of the cell every $n^{th}$ time the WTRU enters active mode. In such an active time, the WTRU may not begin its inactivity timer until it has successfully determined the state of the cell.

The WTRU may determine the state of the cell by assuming that the cell is off until it has received a PDCCH or E-PDCCH implicitly indicating to the WTRU that the cell is on. An example of an implicit indication may be that if the WTRU receives a PDCCH or E-PDCCH (e.g., to assign DL resources, or to grant UL resources, or for paging purposes) it may assume that the cell is on.

A WTRU that is configured with short and/or long DRX cycles may be configured to wake up from inactive mode for measurements on DRS. The WTRU may be configured with subframes where it may expect DRS transmission. During inactive time, the WTRU may wake up for a subframe (e.g., a single subframe) to take a measurement on the DRS and may return (e.g., immediately) to inactive mode, e.g., in the next subframe. The WTRU may remain in inactive mode until a further subframe where DRS is expected or until the inactive period of the DRX cycle expires.

The WTRU may compare measurements taken on DRS during inactive time to those taken in a previous active time to determine the state of the cell. For example, a WTRU that enters inactive time while the cell is in the off state may take measurements on the DRS during the inactive time. If the measurements taken during the inactive time are within a threshold value of those taken before the inactive time, the WTRU may determine the state of the cell has remained the same. A change in the measurements that exceeds the threshold value, or an inability to detect the DRS, may indicate to the WTRU that the DRS is no longer transmitted and the WTRU may determine that the cell has been turned on. Similarly, a WTRU entering the inactive time while its cell is in the on state may take measurements on the DRS during the inactive time. If the measurements on the DRS in the inactive time change beyond a threshold value compared to measurements taken in the active time or if the DRS becomes detectable, the WTRU may determine that the DRS has begun being transmitted and that the cell has been turned off.

The WTRU may be configured to wake up, for example, for the period of a single subframe while in inactive time to attempt to detect the CRS of the serving cell. The presence or absence of the CRS may indicate to the WTRU that the cell is on or off.

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), the WTRU comprising:
   a processor configured to:
   receive a physical downlink control channel (PDCCH) transmission, wherein the PDCCH transmission indicates which of a first set of resources or a second set of resources is to be used by the WTRU;
   determine reference signals to use for radio link monitoring (RLM) based on the received PDCCH transmission, wherein a first set of reference signals is used for RLM responsive to the PDCCH transmission indicating that the first set of resources is to be used by the WTRU and a second set of reference signals is to be used for RLM responsive to the PDCCH transmission indicating that the second set of resources is to be used by the WTRU, wherein the first set of reference signals comprise at least one of a channel state information reference signal (CSI-RS) or a synchronization signal;
   perform RLM measurements using the first set of reference signals if the first set of resources is used by the WTRU, or perform RLM measurements using the second set of reference signals if the second set of resources is used by the WTRU; and
   responsive to a determination that a radio link quality based on the RLM measurements is below a threshold, send a message that indicates a request for a radio resource control (RRC) procedure.

2. The WTRU of claim 1, wherein the first set of resources and the second set of resources are different.

3. The WTRU of claim 2, wherein the first set of resources comprises a first set of physical resource blocks (PRBs), and wherein the second set of resources comprises a second set of PRBs.

4. The WTRU of claim 1, wherein the first set of resources comprises a first bandwidth, and wherein the second set of resources comprises a second bandwidth.

5. The WTRU of claim 1, wherein the first set of reference signals comprise an auxiliary synchronization signal comprises at least one of a primary synchronization signal (PSS), a secondary synchronization signal (SSS), or a physical broadcast channel (PBCH) signal.

6. The WTRU of claim 1, wherein the first set of resources corresponds to the first set of reference signals and the second set of resources corresponds to the second set of reference signals.

7. The WTRU of claim 1, wherein the processor is further configured to determine a radio link quality based on the RLM measurements.

8. A method performed by a wireless transmit/receive unit (WTRU), the method comprising:

receiving a physical downlink control channel (PDCCH) transmission, wherein the PDCCH transmission indicates which of a first set of resources or a second set of resources is to be used by the WTRU;

determining reference signals to use for radio link monitoring (RLM) based on the received PDCCH transmission, wherein a first set of reference signals is used for RLM responsive to the PDCCH transmission indicating that the first set of resources is to be used by the WTRU and a second set of reference signals is to be used for RLM responsive to the PDCCH transmission indicating that the second set of resources is to be used by the WTRU, wherein the first set of reference signals comprise at least one of a channel state information reference signal (CSI-RS) or a synchronization signal;

performing RLM measurements using the first set of reference signals if the first set of resources is used by the WTRU, or performing RLM measurements using the second set of reference signals if the second set of resources is used by the WTRU; and responsive to a determination that a radio link quality based on the RLM measurements is below a threshold, sending a message that indicates a request for a radio resource control (RRC) procedure.

9. The method of claim 8, wherein the first set of resources and the second set of resources are different.

10. The method of claim 9, wherein the first set of resources comprises a first set of physical resource blocks (PRBs), and wherein the second set of resources comprises a second set of PRBs.

11. The method of claim 8, wherein the first set of resources comprises a first bandwidth, and wherein the second set of resources comprises a second bandwidth.

12. The method of claim 8, wherein the first set of reference signals comprise an auxiliary synchronization signal comprises at least one of a primary synchronization signal (PSS), a secondary synchronization signal (SSS), or a physical broadcast channel (PBCH) signal.

13. The method of claim 8, wherein the first set of resources corresponds to the first set of reference signals and the second set of resources corresponds to the second set of reference signals.

14. The method of claim 8, wherein the method further comprises determining a radio link quality based on the RLM measurements.

* * * * *